(12) United States Patent
Wang et al.

(10) Patent No.: US 10,742,982 B2
(45) Date of Patent: *Aug. 11, 2020

(54) METHOD AND APPARATUS FOR CODING MATRIX AND METHOD AND APPARATUS FOR DECODING MATRIX

(71) Applicants: Huawei Technologies Co., Ltd., Shenzhen (CN); TSINGHUA UNIVERSITY, Beijing (CN)

(72) Inventors: Yunfei Wang, Beijing (CN); Jianhua Zheng, Beijing (CN); Xiaozhen Zheng, Shenzhen (CN); Yun He, Beijing (CN)

(73) Assignees: Huawei Technologies Co., Ltd., Shenzhen (CN); Tsinghua Univeristy, Beijing (CN)

( * ) Notice: Subject to any disclaimer, the term of this patent is extended or adjusted under 35 U.S.C. 154(b) by 20 days.

This patent is subject to a terminal disclaimer.

(21) Appl. No.: 16/157,739

(22) Filed: Oct. 11, 2018

(65) Prior Publication Data

US 2019/0082180 A1 Mar. 14, 2019

Related U.S. Application Data

(60) Division of application No. 15/387,305, filed on Dec. 21, 2016, now Pat. No. 10,123,016, which is a (Continued)

(30) Foreign Application Priority Data

Nov. 8, 2011 (CN) .......................... 2011 1 0350455

(51) Int. Cl.
*H04N 19/126* (2014.01)
*H04N 19/593* (2014.01)
(Continued)

(52) U.S. Cl.
CPC ......... *H04N 19/126* (2014.11); *H04N 19/132* (2014.11); *H04N 19/167* (2014.11);
(Continued)

(58) Field of Classification Search
None
See application file for complete search history.

(56) References Cited

U.S. PATENT DOCUMENTS 9,258,568 B2 2/2016 Zheng et al.
2003/0165331 A1 9/2003 Van Der Schaar
(Continued)

FOREIGN PATENT DOCUMENTS

CN 101039421 A 9/2007
CN 101073271 A 11/2007
(Continued)

OTHER PUBLICATIONS

Tanaka et al., "Quantization Matrix for HEVC," 5th Meeting, Geneva, Switzerland, JCTVC-E073, XP030048150, International Telecommunication Union, Geneva, Switzerland (Mar. 16-23, 2011).
(Continued)

*Primary Examiner* — Dakshesh D Parikh
(74) *Attorney, Agent, or Firm* — Leydig, Voit & Mayer, Ltd.

(57) ABSTRACT

A methods and apparatus for coding and decoding a MATRIX. The coding method includes: dividing a MATRIX into layers according to a preset quantity of layers, and grouping MATRIX elements into different layers; performing, according to a determined to-be-coded layer number and in an order of layers one by one, coding processing on MATRIX elements at each layer to be coded; for a layer having a layer number less than or equal to the to-be-coded layer number, writing residual data between an original MATRIX element value corresponding to the layer and a
(Continued)

corresponding MATRIX element predicted value into a bit stream; for a layer having a layer number greater than the to-be-coded layer number, writing no coded data of the layer into the bit stream; and coding the to-be-coded layer number and writing the coded layer number of the coded layer into the bit stream.

20 Claims, 4 Drawing Sheets

Related U.S. Application Data division of application No. 14/273,149, filed on May 8, 2014, now Pat. No. 9,565,429, which is a continuation of application No. PCT/CN2012/084307, filed on Nov. 8, 2012.

(51) Int. Cl.
*H04N 19/463* (2014.01)
*H04N 19/91* (2014.01)
*H04N 19/132* (2014.01)
*H04N 19/167* (2014.01)
*H04N 19/93* (2014.01)
*H04N 19/184* (2014.01)
*H04N 19/70* (2014.01)
*H04N 19/30* (2014.01)

(52) U.S. Cl.
CPC ......... *H04N 19/184* (2014.11); *H04N 19/463* (2014.11); *H04N 19/593* (2014.11); *H04N 19/91* (2014.11); *H04N 19/93* (2014.11); *H04N 19/30* (2014.11); *H04N 19/70* (2014.11)

(56) References Cited

U.S. PATENT DOCUMENTS

2008/0165848 A1 7/2008 Ye et al.
2009/0034612 A1* 2/2009 Zheng .................. H04N 19/176
    375/240.03
2009/0103825 A1* 4/2009 Wang .................... G06T 3/4084
    382/250
2009/0226106 A1 9/2009 Choi et al.
2009/0252217 A1 10/2009 Wittig

FOREIGN PATENT DOCUMENTS

| CN | 101287119 A | 10/2008 |
|---|---|---|
| CN | 101494784 A | 7/2009 |
| CN | 101848069 A | 9/2010 |
| CN | 102227133 A | 10/2011 |
| EP | 1661405 A1 | 5/2006 |
| EP | 2051526 A1 | 4/2009 |
| EP | 2675161 A1 | 12/2013 |
| WO | 2005022918 A1 | 3/2005 |

OTHER PUBLICATIONS

Wang et al., "Non-CE4: Layered quantization matrices compression," 7th Meeting, Geneva, Switzerland, JCTVC-G530, XP030050657, International Telecommunication Union, Geneva, Switzerland (Nov. 21-30, 2011).

"Series H: Audiovisual and Multimedia Systems, Infrastructure of audiovisual services—Coding of moving video, Advanced video coding for generic audiovisual services," ITU-T H.264, pp. 1-680, International Telecommunication Union, Geneva, Switzerland (Jan. 2012).

Tanaka et al., "Enhancement of quantization matrix coding for HEVC," 6th Meeting, Torino, Italy, JCTVC-F475, XP030049468, International Telecommunication Union, Geneva, Switzerland (Jul. 2011).

U.S. Appl. No. 15/387,305, filed Dec. 21, 2016.
U.S. Appl. No. 14/273,149, filed May 8, 2014.

* cited by examiner

METHOD AND APPARATUS FOR CODING MATRIX AND METHOD AND APPARATUS FOR DECODING MATRIX

CROSS-REFERENCE TO RELATED APPLICATIONS

This application is a divisional application of U.S. patent application Ser. No. 15/387,305, filed on Dec. 21, 2016, which is a divisional of U.S. patent application Ser. No. 14/273,149, filed on May 8, 2014, now U.S. Pat. No. 9,565,429, which is a continuation of International Application No. PCT/CN2012/084307, filed on Nov. 8, 2012, which claims priority to Chinese Patent Application No. 201110350455.2, filed on Nov. 8, 2011. All of the aforementioned patent applications are hereby incorporated by reference in their entireties.

TECHNICAL FIELD

Embodiments of the present invention relate to video coding technologies, and in particular, to a method and an apparatus for coding a MATRIX and a method and an apparatus for decoding a MATRIX.

BACKGROUND

In video coding, a residual transform coefficient, for example, a discrete cosine transform (DCT for short) coefficient, of a picture block after prediction needs to be quantized before being coded, where quantization weights at a position of each frequency coefficient of each transform block are a quantization MATRIX (QM for short). A size of a QM equals a size of a DCT transform block. For example, a DCT transform block having a size of 32×32 needs to correspond to a 32×32 QM. Meanwhile, different QMs are also required for different signal components and different (intra-frame/inter-frame) prediction modes of a picture block. An element of a QM is an integer ranging from 0 to 255. Generally, for a low-frequency coefficient, a quantization weight in the QM is small, and for a high-frequency coefficient, a quantization weight in the QM is large. The QM may be used to improve picture subjective quality of a coded video.

At present, in picture coding standards such as JPEG (Joint Photographic Experts Group), MPEG-1 (MPEG, Moving Picture Experts Group), MPEG-2, and MPEG-4, a quantization MATRIX is used to implement subjective quality improvement for a coded picture. In the JPEG picture coding standard, a QM is placed in a picture header; in picture coding standards as MPEG-1, MPEG-2, and MPEG-4, a QM is placed in a sequence header. Therefore, for a sequential picture, each sequence has one QM according to the MPEG picture coding standards. That is, a same sequence uses a same fixed QM to implement quantization processing on a picture.

Picture contents in a picture sequence are not exactly the same. That is, each picture in a same picture sequence depicts different details. Therefore, if a same QM is used to implement quantization processing on all pictures of the entire sequence, evidently, optimal picture subjective quality after quantization and coding cannot be achieved. Therefore, in H.264/Advanced Video Coding (AVC for short), a user-defined QM is provided both in a sequence header and a picture header, so that a QM is changeable for pictures, thereby better satisfying a characteristic of greatly changing contents between video sequential pictures.

The following describes several representative QM implementation methods that are common in existing coding standards:

(1) Quantization MATRIX in JPEG

In the JPEG standard, only one 8×8 DCT (discrete cosine transform) transform size is available. Therefore, a size of a quantization MATRIX is also 8×8, and a total of 64 quantization coefficients are available. Different quantization matrices are used for luma components and chroma components of a picture. All coefficient values of the quantization matrices of JPEG are placed in a picture header, and each picture has only one luma quantization MATRIX and chroma quantization MATRIX. When a quantization MATRIX predefined by default in the standard is used at coding and decoding ends, the quantization MATRIX does not need to be transmitted in a bit stream.

(2) MPEG-2

In the MPEG-2 standard, only one 8×8 DCT transform size is available. Therefore, a size of a quantization MATRIX is also 8×8, and a total of 64 quantization coefficients are available. An intra-frame quantization MATRIX and an inter-frame quantization MATRIX are respectively used for a coded picture. MPEG-2 only allows all pictures in each sequence to have only one intra-frame quantization MATRIX and one inter-frame quantization MATRIX, and the quantization matrices are placed in a sequence header. MPEG-2 also allows a user-defined quantization MATRIX, where the user-defined quantization MATRIX is placed in a sequence extension header. Because the quantization matrices of each sequence cannot be changed, the quantization matrices directly coded into a bit stream do not cause a heavy load.

(3) H.264/AVC Standard

In the H.264/AVC standard, two DCT transform sizes, namely, 8×8 and 4×4, are available. Therefore, two groups of corresponding quantization matrices, 8×8 and 4×4, are also available. The 8×8 quantization MATRIX has a total of 64 coefficients to perform quantization scaling on different frequency components; and the 4×4 quantization MATRIX has a total of 16 coefficients to perform quantization scaling on different frequency components. A 4×4 block and an 8×8 block both have a corresponding quantization MATRIX, the quantization MATRIX is used in picture header syntax. At present, a QM is coded and transmitted in a bit stream by using the following method in H.264/AVC: scanning a QM into a one-dimensional array first; performing modulation by using differential pulse code modulation (DPCM for short); and then coding modulated data by using variable-length code coding and outputting a bit stream. In this method, lossless compression is directly performed on the QM; however, compression efficiency thereof is low, and a high bit rate is still occupied by coded bits of the QM, especially for a bit stream sequence having a small picture size. Therefore, in order to limit a load of the quantization MATRIX in a bit stream of each frame of a coded picture, use of the quantization MATRIX in a picture header is limited only to the H.264/AVC High Profile standard, and the quantization MATRIX is used for high-definition picture coding.

In High Efficiency Video Coding (HEVC for short), transform sizes of a picture block are increased to a plurality of transform sizes, such as 4×4, 8×8, 16×16, and 32×32. Moreover, because a larger transform block is used, a corresponding QM is also larger. If a QM is coded without being compressed or by using the H.264/AVC method, the QM occupies a high bit rate, where coded bits of the QM itself may occupy half or even several times of the bit rate.

SUMMARY

Embodiments of the present invention provide a method and an apparatus for coding a MATRIX and a method and an apparatus for decoding a MATRIX, so as to improve a compression ratio of a quantization MATRIX and reduce a bit rate occupied for transmitting the quantization MATRIX.

In one aspect, the present embodiments provide a method for coding a MATRIX, including:

dividing a MATRIX into layers according to a preset quantity of layers, and grouping MATRIX elements into different layers;

performing, according to a determined to-be-coded layer number and in an order of layers one by one, coding processing on MATRIX elements at each layer to be coded;

if a layer number of a current layer is less than or equal to the to-be-coded layer number, writing residual data, which is obtained by performing a calculation according to an original MATRIX element value corresponding to the current layer and a MATRIX element predicted value corresponding to the current layer, as coded data of the current layer into a bit stream; and if the layer number of the current layer is greater than the to-be-coded layer number, writing no coded data of the current layer into the bit stream;

where the MATRIX element predicted value corresponding to the current layer is obtained by performing an interpolation calculation on a MATRIX element reconstruction value or a MATRIX element predicted value of a coded MATRIX element at a layer that is coded before the current layer and at the current layer of the MATRIX; and coding the to-be-coded layer number and writing the coded layer number into the bit stream.

In one aspect, the present embodiments provide a method for decoding a MATRIX, including:

decoding a bit stream to obtain a layer number of a coded layer of a MATRIX;

obtaining, according to the to-be-coded layer number and coded data of each layer in the MATRIX, which has a layer number less than or equal to the to-be-coded layer number, where the coded data is obtained by decoding the bit stream, a MATRIX element reconstruction value corresponding to each layer having the layer number less than or equal to the to-be-coded layer number in an order of layers one by one; and obtaining, by performing a calculation on the MATRIX element reconstruction value corresponding to the layer having the layer number less than or equal to the to-be-coded layer number, a MATRIX element reconstruction value corresponding to each layer having a layer number greater than the to-be-coded layer number.

In another aspect, the present embodiments provide a method for coding a MATRIX, including:

performing, according to a size of a MATRIX in a MATRIX set and in a coding order, coding on the MATRIX in the MATRIX set one by one to obtain a reconstruction MATRIX of the MATRIX, and performing corresponding sampling processing on the reconstruction MATRIX of the MATRIX to obtain a sampling MATRIX;

obtaining a first error based on a reconstruction MATRIX of a current MATRIX and the current MATRIX, and obtaining a second error based on a sampling MATRIX and the current MATRIX, where the sampling MATRIX is obtained by performing sampling processing on a reconstruction MATRIX of a MATRIX that is coded in the coding order before the current MATRIX;

if the first error is less than or equal to the second error, using the reconstruction MATRIX of the current MATRIX as a coding reconstruction MATRIX of the current MATRIX, and writing a coding result corresponding to the current MATRIX into a bit stream; and if the first error is greater than the second error, using the sampling MATRIX, obtained by performing sampling processing on the reconstruction MATRIX of the MATRIX that is coded in the coding order before the current MATRIX, as the coding reconstruction MATRIX corresponding to the current MATRIX, and writing the coding result corresponding to the current MATRIX into the bit stream.

In another aspect, the present embodiments provide a method for decoding a MATRIX, including:

determining a decoding order corresponding to a MATRIX set and a corresponding sampling method;

decoding a bit stream to obtain an indicator bit for indicating whether a current MATRIX uses a sampling MATRIX;

if the indicator bit indicates that the current MATRIX uses a sampling MATRIX, using a sampling MATRIX, which is obtained by performing sampling processing on a decoding reconstruction MATRIX of a MATRIX decoded in the decoding order before the current MATRIX, as a decoding reconstruction MATRIX of the current MATRIX;

if the indicator bit indicates that the current MATRIX uses no sampling MATRIX, directly decoding the bit stream to obtain the decoding reconstruction MATRIX of the current MATRIX; and decoding the bit stream to obtain all decoding reconstruction matrices of all matrices in the MATRIX set in the decoding order one by one.

In one aspect, the present embodiments provide an apparatus for coding a MATRIX, including:

a layer-dividing module, configured to divide a MATRIX into layers according to a preset quantity of layers, and group MATRIX elements into different layers;

a coding and processing module, configured to perform, according to a determined layer number of a coded layer and in an order of layers one by one, coding processing on MATRIX elements at each layer to be coded; if a layer number of a current layer is less than or equal to the to-be-coded layer number, write residual data, which is obtained by performing a calculation according to an original MATRIX element value corresponding to the current layer and a MATRIX element predicted value corresponding to the current layer, as coded data of the current layer into a bit stream; and if the layer number of the current layer is greater than the to-be-coded layer number, write no coded data of the current layer into the bit stream;

where the MATRIX element predicted value corresponding to the current layer is obtained by performing an interpolation calculation on a MATRIX element reconstruction value or a MATRIX element predicted value of a coded MATRIX element at a layer that is coded before the current layer and at the current layer of the MATRIX; and a first coding and writing module, configured to code the to-be-coded layer number and write the coded layer number into the bit stream.

In one aspect, the present embodiments provide an apparatus for decoding a MATRIX, including:

a layer quantity decoding module, configured to decode a bit stream to obtain a layer number of a coded layer of a MATRIX;

a first reconstructing module, configured to obtain, according to the to-be-coded layer number and coded data of each layer in the MATRIX, which has a layer number less than or equal to the to-be-coded layer number, where the coded data is obtained by decoding the bit stream, a MATRIX element reconstruction value corresponding to each layer having the layer number less than or equal to the to-be-coded layer number in an order of layers one by one; and a second reconstructing module, configured to obtain, by performing a calculation on the MATRIX element reconstruction value corresponding to the layer having the layer number less than or equal to the to-be-coded layer number, a MATRIX element reconstruction value corresponding to each layer having a layer number greater than the to-be-coded layer number.

In another aspect, the present embodiments provide an apparatus for coding a MATRIX, including:

a predicting and coding module, configured to perform, according to a size of a MATRIX in a MATRIX set and in a coding order, coding on the MATRIX in the MATRIX set one by one to obtain a reconstruction MATRIX of the MATRIX, and perform corresponding sampling processing on the reconstruction MATRIX of the MATRIX to obtain a sampling MATRIX;

an error obtaining module, configured to obtain a first error based on a reconstruction MATRIX of a current MATRIX and the current MATRIX, and obtain a second error based on a sampling MATRIX and the current MATRIX, where the sampling MATRIX is obtained by performing sampling processing on a reconstruction MATRIX of a MATRIX that is coded in the coding order before the current MATRIX;

a first coding and reconstructing module, configured to use, if the first error is less than or equal to the second error, the reconstruction MATRIX of the current MATRIX as a coding reconstruction MATRIX corresponding to the current MATRIX, and write a coding result corresponding to the current MATRIX into a bit stream; and a second coding and reconstructing module, configured to use, if the first error is greater than the second error, the sampling MATRIX, obtained by performing sampling processing on the reconstruction MATRIX of the MATRIX that is coded in the coding order before the current MATRIX, as the coding reconstruction MATRIX corresponding to the current MATRIX, and write the coding result corresponding to the current MATRIX into the bit stream.

In another aspect, the present embodiments provide an apparatus for decoding a MATRIX, including:

a determining module, configured to determine a decoding order corresponding to a MATRIX set and a corresponding sampling method;

an indicator decoding module, configured to decode a bit stream to obtain an indicator bit for indicating whether a current MATRIX uses a sampling MATRIX;

a first decoding and reconstructing module, configured to use, if the indicator bit indicates that the current MATRIX uses a sampling MATRIX, a sampling MATRIX, which is obtained by performing sampling processing on a decoding reconstruction MATRIX of a MATRIX decoded in the decoding order before the current MATRIX, as a decoding reconstruction MATRIX of the current MATRIX;

a second decoding and reconstructing module, configured to directly decode the bit stream to obtain the decoding reconstruction MATRIX of the current MATRIX if the indicator bit indicates that the current MATRIX uses no sampling MATRIX; and a triggering module, configured to trigger the indicator decoding module, the first decoding and reconstructing module, and the second decoding and reconstructing module, thereby decoding the bit stream to obtain all decoding reconstruction matrices of all matrices in the MATRIX set in the decoding order one by one.

According to the method and apparatus for coding a MATRIX provided in one aspect of the present invention, MATRIX elements are grouped into different layers by using a layered structure; then coding is performed on each layer according to a determined to-be-coded layer number; and residual data between an original MATRIX element value and a MATRIX element predicted value corresponding to the layer is written as coded data into a bit stream, or no coded data corresponding to the layer is written into the bit stream, which improves a compression ratio of the MATRIX and reduces a bit rate occupied for transmitting the MATRIX.

The method and apparatus for decoding a MATRIX provided in one aspect of the present invention correspond to the method and apparatus for coding a MATRIX provided in one aspect of the present invention, where the to-be-coded layer number and coded data of a layer having a layer number less than or equal to the to-be-coded layer number are obtained by decoding a bit stream, and then reconstruction of a MATRIX is implemented based on the decoded data, so that a coding end may code the MATRIX by using a layer structure, and transmit the coded MATRIX, which improves a compression ratio of the MATRIX and reduces a bit rate occupied for transmitting the MATRIX.

According to the method and apparatus for coding a MATRIX provided in another aspect of the present invention, coding processing is performed on a plurality of matrices in a MATRIX set in a coding order one by one, and a MATRIX having a smaller error is selected as an encoding reconstruction MATRIX of a MATRIX from a reconstruction MATRIX obtained by performing coding prediction on each MATRIX and a sampling MATRIX obtained by performing sampling on a MATRIX that is coded before, and then a coding result is written into a bit stream. When a sampling MATRIX is used, only an indicator bit instead of the entire MATRIX needs to be written into the bit stream, thereby improving a compression ratio of the MATRIX and reducing a bit rate occupied for transmitting the MATRIX.

The method and apparatus for decoding a MATRIX provided in another aspect of the present invention correspond to the method and apparatus for coding a MATRIX provided in another aspect of the present invention, where an indicator bit corresponding to each MATRIX and indicating whether a MATRIX uses a sampling MATRIX is obtained by decoding a bit stream; a decoding reconstruction MATRIX of a current MATRIX is obtained according to the indicator bit or by performing sampling on a decoding reconstruction MATRIX of a MATRIX that is decoded before, or a decoding reconstruction MATRIX of a current MATRIX is obtained by directly decoding the bit stream; and then all decoding reconstruction matrices of all matrices are obtained through decoding in a decoding order, which improves a compression ratio of the MATRIX and reduces a bit rate occupied for transmitting the MATRIX.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordi

DESCRIPTION OF EMBODIMENTS

To make the objectives, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Figures 1A, 1B, 1C:
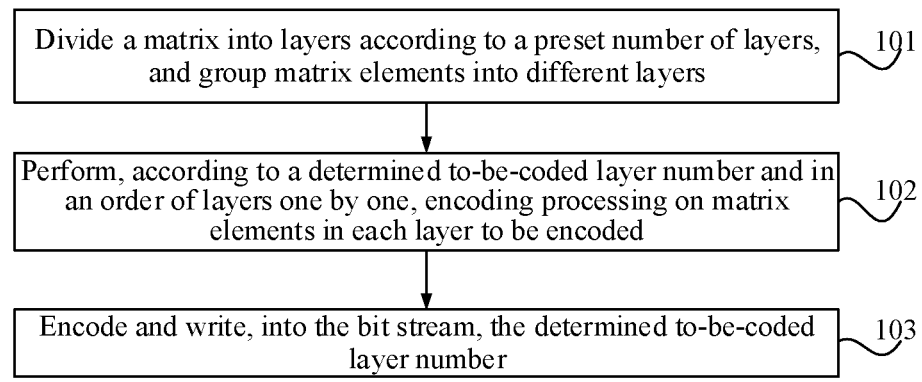
- FIG. 1A is a flowchart of a method for coding a MATRIX according to an embodiment of the present invention.
FIG. 1B is a schematic diagram of a layered structure of an 8×8 MATRIX according to an embodiment of the present invention.
FIG. 1C is a schematic diagram of a layered structure of a 4×4 MATRIX according to an embodiment of the present invention.

FIG. 1A is a flowchart of a method for coding a MATRIX according to an embodiment of the present invention. As shown in FIG. 1A, the method according to this embodiment includes the following:

Step 101: Divide a MATRIX into layers according to a preset quantity of layers, and group MATRIX elements into different layers.

In the embodiments of the present invention, the MATRIX refers to a MATRIX that needs to be coded and compressed at a coding end, and then transmitted to a decoding end. The MATRIX may be, for example, any one or a combination of a QM, a scaling MATRIX, a coefficient weighting MATRIX, a transform-domain MATRIX after the QM is transformed, a transform-domain MATRIX after the scaling MATRIX is transformed, a transform-domain MATRIX after the coefficient weighting MATRIX is transformed, a prediction residual MATRIX after coding prediction is performed on the QM, a prediction residual MATRIX after coding prediction is performed on the scaling MATRIX, or a prediction residual MATRIX after coding prediction is performed on the coefficient weighting MATRIX. The transform may be Z-transform, DCT transform, DFT (Fourier Transform) transform, or the like. The coding prediction refers to coding a QM, a scaling MATRIX, a coefficient weighting MATRIX, or the like, and then obtaining a residual between the MATRIX after coding and the MATRIX before coding (that is, an original MATRIX on which no coding is performed). A coding method, for example, DPCM, for performing the coding prediction, is not limited.

In this embodiment, a coding architecture is layered coding. That is, all elements of a MATRIX are divided into several layers, and each layer includes different MATRIX elements. Different quantities of layers are defined in advance for matrices of different sizes. For example, a MATRIX having a size of 4×4 may be predefined to be divided into four layers, where a value range of the numbers of layers is 0 to 3; a MATRIX having a size of 8×8 may be predefined to be divided into five layers, where a value range of the numbers of layers is 0 to 4; a MATRIX having a size of 16×16 may be predefined to be divided into six layers, where a value range of the numbers of layers is 0 to 5; and a MATRIX having a size of 32×32 may be predefined to be divided into seven layers, where a value range of the numbers of layers is 0 to 6. A specific value of the predefined quantity of layers is not fixed, and may be adjusted and predefined according to a size of a MATRIX. If the quantity of MATRIX elements included in a layer is increased, the quantity of layers into which the MATRIX is divided may be decreased.

In this embodiment, the coding end divides the MATRIX into layers according to the preset quantity of layers, for example, divides a 4×4 MATRIX into four layers, divides an 8×8 MATRIX into five layers, and the like. A dividing method for dividing the MATRIX into layers may be any method, which is not limited in this embodiment. The following exemplifies the dividing method in use by using an example where an 8×8 MATRIX is divided into five layers and a 4×4 MATRIX is divided into four layers.

For example, for an 8×8 MATRIX, an upper left corner and a lower right corner of the 8×8 MATRIX may be used as Layer 0, a lower left corner and an upper right corner as Layer 1, a center of the 8×8 MATRIX and a midpoint of four sides as Layer 2; then Layer 3 is marked out; and a remaining part is Layer 4. A dividing result of this dividing method is shown in FIG. 1B, where digits 0, 1, 2, 3, and 4 represent a position of a MATRIX element corresponding to Layer 0, Layer 1, Layer 2, Layer 3, and Layer 4 respectively. A value range of the numbers of layers is 0 to 4, and a total of five layers may be marked out.

For example, for a 4×4 MATRIX, an upper left corner and a lower right corner of the 4×4 MATRIX may be used as Layer 0, a lower left corner and an upper right corner as Layer 1, a center of the 4×4 MATRIX and a midpoint of four sides as Layer 2, and a remaining part as Layer 3. A dividing result of this dividing method is shown in FIG. 1C, where digits 0, 1, 2, and 3 represent a position of a MATRIX element corresponding to Layer 0, Layer 1, Layer 2, and Layer 3 respectively. A value range of the numbers of layers is 0 to 3, and a total of four layers may be divided.

The quantity of layers and/or the dividing method in use may be agreed upon in advance between the coding end and a decoding end, therefore the coding end does not need to code the quantity of layers and/or the dividing method and transmit the coded quantity and/or the coded dividing method to the decoding end by using a bit stream, which helps to reduce a burden and complexity for the coding end and the decoding end to perform coding and decoding, and reduces the bit stream to be transmitted. For example, if the coding end and the decoding end agree in advance only upon the quantity of layers, the coding end needs to cod the dividing method, write the coded dividing method into the bit stream, and transmit the bit stream to the decoding end, so that the decoding end performs decoding correctly. If the coding end and the decoding end agree in advance only upon the dividing method but do not agree upon the quantity of layers, the coding end needs to code the quantity of layers, write the coded quantity into the bit stream, and transmit the bit stream to the decoding end, so that the decoding end performs decoding correctly. If the coding end and the decoding end agree in advance upon the quantity of layers and the dividing method, the coding end does not need to code the quantity of layers and the dividing method or write the coded quantity and the coded dividing method into the bit stream.

In addition, it is also allowed that the decoding end and the coding end agree in advance upon neither the quantity of layers nor the dividing method in use. Therefore, the coding end codes both the quantity of layers and the dividing method, write the coded quantity and the coded dividing method into the bit stream, and transmit the bit stream to the decoding end, so as to provide the decoding end with information required for performing decoding. This manner helps to change the quantity of layers and the dividing method, providing certain flexibility.

Step 102: Perform, according to a determined to-be-coded layer number and in an order of layers one by one, coding processing on MATRIX elements at each layer to be coded.

After the MATRIX is divided into layers, the coding end starts to perform coding processing on each layer in an order of layers. The order of layers is coding a low layer before coding a high layer, that is, coding the layers starting from Layer 0 in ascending order of layer numbers one by one.

In this embodiment, for matrices of different sizes, the coding end may determine a layer number of a coded layer used for coding the MATRIX, that is, determine a layer number of a coded layer, and then perform coding processing according to the determined layer number of the coded layer. A value range of the to-be-coded layer number is greater than or equal to 0 and is less than the preset quantity of layers. The coding end performs coding processing on the layers in the following manners based on the determined layer number of the coded layer:

If a layer number of a current layer is less than or equal to the determined layer number of the coded layer, the coding end writes residual data, which is obtained by performing a calculation according to an original MATRIX element value corresponding to the current layer and a MATRIX element predicted value corresponding to the current layer, as coded data of the current layer into a bit stream. Correspondingly, the decoding end decodes the bit stream to obtain the coded data of the current layer, and performs addition processing on the coded data of the current layer with a MATRIX element predicted value corresponding to the current layer to obtain a MATRIX element reconstruction value corresponding to the current layer. The MATRIX element reconstruction value corresponding to the current layer, which is obtained by the decoding end, is the same as the original MATRIX element value corresponding to the current layer. This implements lossless coding for the current layer.

If the layer number of the current layer is greater than the determined layer number of the coded layer, the coding end writes no coded data of the current layer into the bit stream. The decoding end may obtain a MATRIX element reconstruction value corresponding to the current layer by performing an interpolation calculation on a MATRIX element reconstruction value corresponding to a layer that is decoded before the current layer or a reconstructed MATRIX element reconstruction value at the current layer. In this case, there may be a residual between the MATRIX element reconstruction value corresponding to the current layer and the original MATRIX element value corresponding to the current layer, which is lossy coding.

In this embodiment, the current layer refers to a layer on which coding is being performed currently. For example, it is assumed that the determined layer number of the coded layer is 2, that is, coding is to be performed on MATRIX elements of Layers 0 to 2 among layers marked out from the MATRIX. If a current layer is Layer 0, a layer number of the current layer is 0, and the layer number of the current layer is less than the to-be-coded layer number. If a current layer is Layer 2, a layer number of the current layer is 2, and the layer number of the current layer is equal to the to-be-coded layer number. If a current layer is Layer 3, a layer number of the current layer is 3, and the layer number of the current layer is greater than the to-be-coded layer number.

The MATRIX element predicted value corresponding to the current layer is obtained by performing an interpolation calculation on a MATRIX element reconstruction value or a MATRIX element predicted value of a coded MATRIX element at a layer that is coded before the current layer and at the current layer of the MATRIX. In other words, in this embodiment, a MATRIX element predicted value corresponding to each layer is obtained in an interpolation manner. The interpolation manner may be performing interpolation according to a MATRIX element reconstruction value or a MATRIX element predicted value of a MATRIX element that is coded before a current MATRIX element to be interpolated (or referred to as to-be-coded), thereby obtaining a MATRIX element predicted value of the current MATRIX element to be interpolated. For example, interpolation is performed according to a MATRIX element predicted value or a MATRIX element reconstruction value corresponding to Layer 0 to obtain a MATRIX element predicted value corresponding to Layer 1, and interpolation is performed according to the MATRIX element predicted value or the MATRIX element reconstruction value corresponding to Layer 0 and Layer 1 to obtain a MATRIX element predicted value of Layer 2. For another example, interpolation is performed according to a MATRIX element value corresponding to Layer 0 to obtain a MATRIX element predicted value corresponding to other layers. For another example, interpolation is performed according to a MATRIX element predicted value corresponding to Layer 0 to obtain a MATRIX element predicted value corresponding to Layer 1 and Layer 2, and then interpolation is performed according to the MATRIX element predicted value or a MATRIX element reconstruction value corresponding to Layer 1 and/or Layer 2 to obtain a MATRIX element predicted value corresponding to other layers. For another example, interpolation is performed according to a MATRIX element value corresponding to Layer 0 to obtain partial MATRIX element predicted values at Layer 1, and then interpolation is performed according to the MATRIX element predicted value, obtained by interpolation, at Layer 0 and Layer 1 to obtain other MATRIX element predicted values at Layer 1.

For a layer having a layer number less than or equal to the to-be-coded layer number, a MATRIX element reconstruction value corresponding to the layer equals an original MATRIX element value corresponding to the layer. For a layer having a layer number greater than the to-be-coded layer number, a MATRIX element reconstruction value corresponding to the layer may be obtained by performing interpolation according to a MATRIX element reconstruction value corresponding to a layer having a smaller layer number.

A MATRIX element predicted value corresponding to a lowest layer may be an original MATRIX element value corresponding to the lowest layer, or be one or a group of preset default values, and may be used as an initial value to perform interpolation to obtain a MATRIX element predicted value corresponding to other layers.

A process of obtaining the MATRIX element predicted value corresponding to the current layer by performing interpolation according to the coded MATRIX element reconstruction value or MATRIX element predicted value at the layer that is coded before the current layer and at the current layer of the MATRIX may be obtaining the MATRIX element predicted value corresponding to the current layer by performing a uniform interpolation calculation or a weighted interpolation calculation according to the coded MATRIX element reconstruction value or MATRIX element predicted value at the layer that is coded before the current layer and at the current layer of the MATRIX. The following exemplifies a process of performing layered coding processing on a MATRIX by using a layered MATRIX illustrated in FIG. 1B and a uniform interpolation calculation as an example.

Firstly, assume that the to-be-coded layer number, which is determined by a coding end, is 2.

Perform coding processing on Layer 0. Because Layer 0 is a lowest layer, an original MATRIX element value or default value residual data may be used as a MATRIX element predicted value of Layer 0. Assume that a default value is used as a predicted value of an element A (0,0) at Layer 0, for example, use 6 as a MATRIX element predicted value corresponding to the element A (0,0); and then write the predicted value into a bit stream as coded data of A (0,0). No prediction is performed on the element A (7,7) of Layer 0. That is, an original value of the element A (7,7) in the MATRIX is directly coded and written into the bit stream.

Perform coding processing on Layer 1. Firstly, obtain a MATRIX element predicted value corresponding to Layer 1 according to the MATRIX element predicted value (where the MATRIX element predicted value is used as an example) corresponding to Layer 0. Assume that a uniform interpolation calculation method is used, and (A (0,0)+A (7,7)+1)/2 is used as a predicted value for both an element A (0,7) and an element A (7,0) of Layer 1, where "/" indicates integer division.

Because a layer number of Layer 1 is less than the determined layer number of the coded layer (that is, 1<2), residual data between an original MATRIX element value corresponding to each MATRIX element of Layer 1 and a MATRIX element predicted value corresponding to each MATRIX element of Layer 1 is written as coded data of Layer 1 into the bit stream. For Layer 1, a MATRIX element reconstruction value corresponding to Layer 1, which is obtained by a decoding end, is the same as the original MATRIX element value corresponding to Layer 1. Therefore, lossless coding is performed on Layer 1.

Perform coding processing on Layer 2. For example, assume that a MATRIX element predicted value of Layer 2 is obtained by performing a uniform interpolation calculation according to the MATRIX element predicted value corresponding to Layers 0 to 1 that are coded before Layer 2. An order for performing interpolation on MATRIX elements at each layer may be performing vertical interpolation before performing horizontal interpolation, or performing horizontal interpolation before performing vertical interpolation. Horizontal interpolation refers to performing, based on a row index of a MATRIX element and by using another interpolated MATRIX element predicted value having the same row index and according to a specific interpolation method, interpolation on a MATRIX element to be interpolated in the row. Vertical interpolation refers to performing, based on a column index of a MATRIX element and by using another interpolated MATRIX element predicted value having the same column index and according to a specific interpolation method, interpolation on a MATRIX element to be interpolated in the column. For example, in this embodiment, an interpolation calculation is performed on Layer 2 in an order of horizontal interpolation before vertical interpolation to obtain that a predicted value of an element A (0,3) is (A (0,0)+A (0,7)+1)/2, a predicted value of an element A (7,3) is (A (7,0)+A (7,7)+1)/2, a predicted value of an element A (3,0) is (A (0,0)+A (7,0)+1)/2, a predicted value of an element A (3,3) is (A (0,3)+A (7,3)+1)/2, and a predicted value of an element A (3,7) is (A (0,7)+A (7,7)+1)/2.

Because a layer number of Layer 2 equals the determined layer number of the coded layer (that is, 2=2), residual data between an original MATRIX element value corresponding to each MATRIX element of Layer 2 and a MATRIX element predicted value corresponding to each MATRIX element of Layer 2 is written as coded data of Layer 2 into the bit stream. For Layer 2, a MATRIX element reconstruction value corresponding to Layer 2, which is obtained by a decoding end, is the same as the original MATRIX element value corresponding to Layer 2. Therefore, lossless coding is performed on Layer 2.

Perform coding processing on Layer 3. For example, assume that a MATRIX element predicted value of Layer 3 is obtained by using a uniform interpolation calculation method according to the MATRIX element predicted value corresponding to Layers 0 to 2 that are coded before Layer 3 and to a coded MATRIX element at Layer 3. A specific interpolation order may be performing vertical interpolation before horizontal interpolation, or performing horizontal interpolation before vertical interpolation. In this embodiment, it is assumed that the interpolation calculation is performed in an order of vertical interpolation before horizontal interpolation to obtain that a predicted value of an element A (0,1) is (A (0,0)+A (0,3)+1)/2, a predicted value of an element A (0,5) is (A (0,3)+A (0,7)+1)/2, a predicted value of an element A (3,1) is (A (3,0)+A (3,3)+1)/2, a predicted value of an element A (1,0) is (A (0,0)+A (0,3)+1)/2, a predicted value of an element A (1,3) is (A (0,3)+A (3,3)+1)/2, a predicted value of an element A (1,1) is (A (0,1)+A (3,1)+1)/2, a predicted value of an element A (3,5) is (A (3,3)+A (3,7)+1)/2, a predicted value of an element A (1,7) is (A (0,7)+A (3,7)+1)/2, and a predicted value of an element A (1,5) is (A (0,5)+A (3,5)+1)/2, and the like, which are not fully listed herein.

Because a layer number of Layer 3 is greater than the determined layer number of the coded layer (that is, 3>2), no coded data of Layer 3 is written into the bit stream. For Layer 3, a MATRIX element reconstruction value corresponding to Layer 3, which is obtained by a decoding end, may be different from the original MATRIX element value corresponding to Layer 3. Therefore, lossy coding is performed on Layer 3.

Perform coding processing on Layer 4. Firstly, assume that a MATRIX element predicted value of Layer 4 is obtained in a uniform interpolation calculation manner according to a MATRIX element predicted value corresponding to Layers 0 to 3 that are coded before Layer 4 and to a coded MATRIX element at Layer 4. At Layer 4, a predicted value of each MATRIX element at Layer 4 may also be obtained by performing vertical interpolation before horizontal interpolation or by performing horizontal interpolation before vertical interpolation.

Because a layer number of Layer 4 is greater than the determined layer number of the coded layer (that is, 4>2), no coded data of Layer 4 is written into the bit stream. For Layer 4, a MATRIX element reconstruction value corresponding to Layer 4, which is obtained by a decoding end, may be different from the original MATRIX element value corresponding to Layer 4. Therefore, lossy coding is performed on Layer 4.

In the foregoing process, the coding end may code coded data of one layer each time the coded data of the layer is obtained, and then write a coding result into the bit stream. However, the process is not limited to this manner. For example, the coding end may also perform coding uniformly after obtaining coded data corresponding to all layers, and then write a coding result into the bit stream.

Further, in this embodiment, a coding method used for coding the coded data of each layer is not limited. However, in this embodiment, for a layer having a small layer number, coded data of the layer may be large, which is generally normal distribution with 0 as a mean value. Therefore, preferably, variable-length code coding is performed on the coded data of the layer and the coded data after the variable-length code coding is written into the bit stream. For a layer having a large layer number, coded data of the layer may be mostly 0; therefore, preferably, run-length coding is performed on the coded data of the layer and the coded data after the run-length coding is written into the bit stream. One layer number threshold is set at the coding end, and the numbers of the coded layers may be distinguished based on the set layer number threshold. In an example where a layer number threshold is set to 4, if a layer number of the layer is less than or equal to 4, variable-length code coding is performed on coded data of the layer and the coded data after the variable-length code coding is written into the bit stream; and if the layer number of the layer is greater than 4, run-length coding is performed on the coded data of the layer and the coded data after the run-length coding is written into the bit stream.

Further, in the foregoing example, if the coding end needs to code the quantity of layers of an 8×8 MATRIX and a dividing method in use and write the coded quantity and dividing method into the bit stream, specifically, the quantity of layers and a position in the MATRIX, of a MATRIX element included at each layer are coded and written into the bit stream.

Step 103: Code the determined layer number of the coded layer and write the coded determined layer number into the bit stream.

The to-be-coded layer number is determined by the coding end, and indicates that for MATRIX elements divided into the preset quantity of layers, coding is performed only on MATRIX elements of a layer number less than or equal to the to-be-coded layer number and a coding result is written into the bit stream, and for MATRIX elements of a layer number greater than the to-be-coded layer number, only prediction is performed, a MATRIX element predicted value is used as a reconstruction value, and no coding result needs to be written into the bit stream. Therefore, in addition to writing the coded data of the layers in the MATRIX into the bit stream, the to-be-coded layer number also needs to be coded, written into the bit stream, and transmitted to the decoding end, so that the decoding end can perform a decoding operation correspondingly according to the to-be-coded layer number.

In addition, according to the foregoing coding manner, if a layer number of a current layer is less than or equal to the to-be-coded layer number, this embodiment may implement lossless coding on the layer; and if the layer number of the current layer is greater than the to-be-coded layer number, this embodiment implements lossy coding on the layer. In other words, the to-be-coded layer number may be adjusted to implement control over lossy or lossless coding on the MATRIX.

In this embodiment, a coding end codes, by using a layer structure, a MATRIX to be coded, and when a layer in the MATRIX needs to be coded, data to be coded (that is, coded data of the layer) is only residual data, which has a small data volume. Moreover, a layer does not need to be coded. This implements coding and compression for the MATRIX, and compared with the prior art, improves compression efficiency for the MATRIX and reduces a bit rate occupied for transmitting the MATRIX. The method for coding a MATRIX according to this embodiment can greatly improve a compression ratio especially in a process of coding a small sequence.

Further, for the same MATRIX, the quantity of layers may be changed to change a compression ratio of the MATRIX. For example, the quantity of layers may be increased and the to-be-coded layer number may be decreased to improve the compression ratio, thereby providing certain flexibility.

Figure 2:
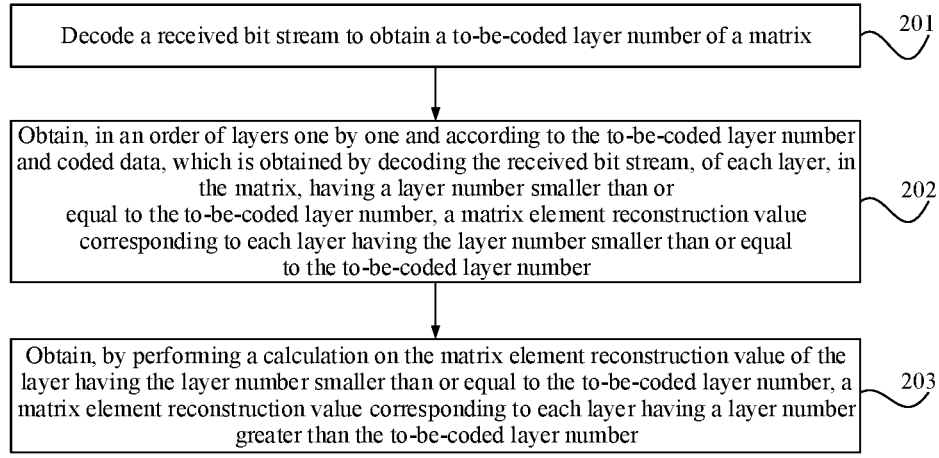
FIG. 2 is a flowchart of a method for decoding a MATRIX according to an embodiment of the present invention.

FIG. 2 is a flowchart of a method for decoding a MATRIX according to an embodiment of the present invention. As shown in FIG. 2, the method according to this embodiment includes the following:

Step 201: Decode a received bit stream to obtain a layer number of a coded layer of a MATRIX.

The method for decoding a MATRIX according to this embodiment corresponds to the method for coding a MATRIX illustrated in FIG. 1A, which decodes the bit stream that is coded by using a layer structure, and reconstructs the MATRIX that is coded by a coding end. A decoding end receives the bit stream transmitted by the coding end, and decodes the bit stream to obtain the to-be-coded layer number of the MATRIX first, thereby laying a foundation for performing decoding later. The to-be-coded layer number is the to-be-coded layer number, which is determined and written into the bit stream by the coding end, and is used to represent layers having corresponding coded data in the bit stream. In other words, obtaining the to-be-coded layer number through decoding may determine layers, which can be obtained by directly decoding the bit stream.

Step 202: Obtain, in an order of layers one by one and according to the to-be-coded layer number and coded data of each layer in the MATRIX, which has a layer number less than or equal to the to-be-coded layer number, where the coded data is obtained by decoding the received bit stream, a MATRIX element reconstruction value corresponding to each layer having the layer number less than or equal to the to-be-coded layer number.

In this embodiment, the bit stream received by the decoding end includes the coded data of each layer having the layer number less than or equal to the to-be-coded layer number. The decoding end decodes, according to information such as the decoded quantity of coded layers, a quantity of layers of the MATRIX (that is, information about the quantity of layers into which the MATRIX is divided), a dividing method, and the like, the received bit stream for coding the MATRIX to obtain the coded data of each layer having the layer number less than or equal to the to-be-coded layer number.

If the coding end performs coding on coded data of different layers in different manners according to a set layer number threshold, the decoding end also needs to decode the bit stream by using a corresponding method. If a layer number of a current layer is less than or equal to the set layer number threshold, the coding end codes coded data by using variable-length code coding; correspondingly, the decoding end needs to perform variable-length code decoding on a bit stream corresponding to the current layer to obtain coded data of the current layer. If the layer number of the current layer is greater than the set layer number threshold, the coding end codes the coded data by using run-length coding; correspondingly, the decoding end needs to perform run-length decoding on a bit stream corresponding to the current layer to obtain coded data of the current layer.

The quantity of layers and/or a dividing method for dividing the MATRIX may be agreed upon by the coding end and the decoding end in advance. For example, when the coding end and the decoding end agree in advance only upon the quantity of layers in use, the coding end may code the dividing method in use, write the coded dividing method into the bit stream, and transmit the bit stream to the decoding end. Correspondingly, the decoding end decodes, before decoding the bit stream to obtain the coded data of each layer having the layer number less than or equal to the to-be-coded layer number in the MATRIX, the bit stream to obtain the dividing method in use, and decodes the bit stream to obtain the coded data of each layer according to the quantity of layers and the dividing method agreed upon. For another example, when the coding end and the decoding end agree in advance only upon the dividing method in use, the coding end may code the set quantity of layers, write the coded quantity into the bit stream, an transmit the bit stream to the decoding end. Correspondingly, the decoding end decodes, before decoding the bit stream to obtain the coded data of each layer having the layer number less than or equal to the to-be-coded layer number in the MATRIX, the bit stream to obtain the quantity of layers, and decodes the bit stream to obtain the coded data of each layer according to the decoded quantity of layers and the dividing method agreed upon. For another example, when the coding end and the decoding end agree in advance upon both the quantity of layers and the dividing method in use, the decoding end may directly decode the bit stream to obtain the coded data of each layer according to the quantity of layers and the agreed upon dividing method.

When the coding end and the decoding end agree in advance upon neither the quantity of layers nor the dividing method, the coding end codes both the quantity of layers and the dividing method, writes the coded quantity and the coded dividing method into the bit stream, and transmits the bit stream to the decoding end. Correspondingly, the decoding end decodes, before decoding the bit stream to obtain the coded data of each layer having the layer number less than or equal to the to-be-coded layer number in the MATRIX, the received bit stream to obtain the quantity of layers and the dividing method.

The coded data of each layer having the layer number less than or equal to the to-be-coded layer number is residual data obtained by the coding end by performing a calculation on an original MATRIX element value corresponding to each layer having the layer number less than or equal to the to-be-coded layer number and a MATRIX element predicted value respectively corresponding to the layer. Moreover, the MATRIX element predicted value corresponding to each layer is obtained by performing an interpolation calculation on a MATRIX element reconstruction value or a MATRIX element predicted value of a coded MATRIX element at a layer that is coded before the current layer and at the current layer. Therefore, after obtaining the coded data of each layer having the layer number less than or equal to the to-be-coded layer number, the decoding end performs addition processing on the coded data of each layer having the layer number less than or equal to the to-be-coded layer number respectively with a MATRIX element predicted value corresponding to each layer having the layer number less than or equal to the to-be-coded layer number, thereby obtaining the MATRIX element reconstruction value corresponding to each layer having the layer number less than or equal to the to-be-coded layer number. According to the foregoing description, the MATRIX element reconstruction value of each layer having the layer number less than or equal to the to-be-coded layer number, which is obtained through decoding in this step, is the same as the original MATRIX element value corresponding respectively to the layer, therefore lossless coding is performed. However, compared with directly transmitting the original MATRIX element value itself, a volume of data to be transmitted is much smaller.

The decoding end may also obtain the MATRIX element predicted value corresponding to each layer having the layer number less than or equal to the to-be-coded layer number in the same interpolation manner as the coding end, that is, perform interpolation by using a MATRIX element predicted value obtained by interpolation at a low layer, thereby obtaining a MATRIX element predicted value of a high layer. A specific interpolation method may be a uniform interpolation calculation method or a weighted interpolation calculation method. For example, interpolation may be performed according to a MATRIX element predicted value corresponding to Layer 0 to obtain a MATRIX element predicted value corresponding to Layer 1, and interpolation may be performed according to MATRIX element predicted values corresponding to Layer 0 and Layer 1 to obtain a MATRIX element predicted value of Layer 2. For another example, interpolation is performed according to a MATRIX element value corresponding to Layer 0 to obtain a MATRIX element predicted value corresponding to other layers. For still another example, interpolation is performed according to the MATRIX element predicted value corresponding to Layer 0 to obtain MATRIX element predicted values corresponding to Layer 1 and Layer 2, and then interpolation is performed according to the MATRIX element predicted value corresponding to Layer 1 and/or Layer 2 to obtain a MATRIX element predicted value corresponding to other layers.

When performing the interpolation calculation, the decoding end performs an interpolation operation according to an interpolation order obtained in advance, where the interpolation order may be horizontal interpolation before vertical interpolation, or vertical interpolation before horizontal interpolation.

In the foregoing manner, a MATRIX element predicted value corresponding to a lowest layer may be an original MATRIX element value corresponding to the lowest layer, or be one or a group of preset default values, and may be used as an initial value to perform interpolation to obtain a MATRIX element predicted value corresponding to other layers. Moreover, the MATRIX element predicted value corresponding to the lowest layer is known to the decoding end.

It is noted herein that a process for the decoding end to obtain the MATRIX element reconstruction value corresponding to each layer having the layer number less than or equal to the to-be-coded layer number may be obtaining, when coded data of one layer is obtained through decoding, a MATRIX element reconstruction value corresponding to the layer. In addition, the process for the decoding end to obtain the MATRIX element reconstruction value corresponding to each layer having the layer number less than or equal to the to-be-coded layer number may also be obtaining, after coded data of each layer having the layer number less than or equal to the to-be-coded layer number is obtained through decoding, the MATRIX element reconstruction value corresponding to each layer having the layer number less than or equal to the to-be-coded layer number together.

Step 203: Obtain, by performing a calculation on the MATRIX element reconstruction value of the layer having the layer number less than or equal to the to-be-coded layer number, a MATRIX element reconstruction value corresponding to each layer having a layer number greater than the to-be-coded layer number.

After obtaining the MATRIX element reconstruction value corresponding to each layer having the layer number less than or equal to the to-be-coded layer number, the decoding end performs an interpolation calculation on the MATRIX element reconstruction value corresponding to the layer having the layer number less than or equal to the to-be-coded layer number, thereby obtaining a MATRIX element reconstruction value of each layer having a layer number greater than the to-be-coded layer number.

The interpolation method corresponds to the coding end, and may be, for example, a uniform interpolation calculation or a weighted interpolation calculation. A specific interpolation manner also corresponds to the coding end. For example, a MATRIX element reconstruction value corresponding to one layer of the layers having a layer number less than or equal to the to-be-coded layer number may be used to perform an interpolation calculation to obtain the MATRIX element reconstruction value corresponding to each layer having the layer number greater than the to-be-coded layer number; or a MATRIX element reconstruction value corresponding to several layers of the layers may be used to perform an interpolation calculation to obtain the MATRIX element reconstruction value corresponding to each layer having the layer number greater than the to-be-coded layer number. Moreover, an interpolation order also corresponds to the coding end, which may be, for example, horizontal interpolation before vertical interpolation, or may be vertical interpolation before horizontal interpolation.

In this step, the MATRIX element reconstruction value corresponding to each layer having the layer number greater than the to-be-coded layer number, which is obtained by the decoding end, is the same as the MATRIX element predicted value corresponding to each layer having the layer number greater than the to-be-coded layer number, which is obtained by the coding end, and may have a certain error with the original MATRIX element value. Therefore, lossy coding is performed.

In addition, if no layer has a layer number greater than the to-be-coded layer number, an operation of this step may be omitted. In other words, the coding end performs lossless coding on the MATRIX.

Reconstruction of the MATRIX is implemented after the MATRIX element reconstruction value corresponding to all layers marked out from the MATRIX is obtained.

In this embodiment, the reconstructed MATRIX may be any one or a combination of a QM, a scaling MATRIX, a coefficient weighting MATRIX, a transform-domain MATRIX after the QM is transformed, a transform-domain MATRIX after the scaling MATRIX is transformed, a transform-domain MATRIX after the coefficient weighting MATRIX is transformed, a prediction residual MATRIX after coding prediction is performed on the QM, a prediction residual MATRIX after coding prediction is performed on the scaling MATRIX, or a prediction residual MATRIX after coding prediction is performed on the coefficient weighting MATRIX. The transform may be Z-transform, DCT transform, DFT transform, or the like. The coding prediction refers to coding a QM, a scaling MATRIX, a coefficient weighting MATRIX, or the like, and then obtaining a residual between the MATRIX after coding and the MATRIX before coding (that is, an original MATRIX on which no coding is performed). A coding method, for example, DPCM, for performing the coding prediction, is not limited.

The method for decoding a MATRIX according to this embodiment corresponds to the method for coding a MATRIX according to the foregoing embodiment. A coding end performs coding by using a layer structure, thereby implementing compression on a MATRIX to a great extent, improving a compression ratio, and reducing a bit rate occupied for transmitting the MATRIX. The decoding end performs layered decoding correspondingly, thereby implementing reconstruction of the MATRIX.

Figure 3:
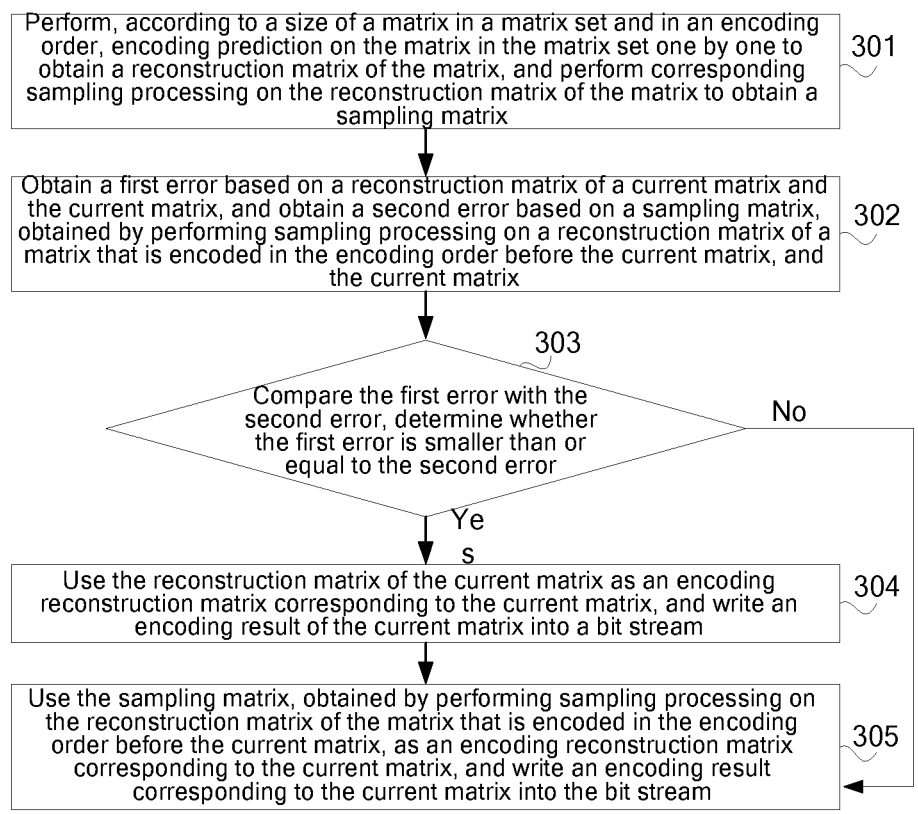
FIG. 3 is a flowchart of a method for coding a MATRIX according to an embodiment of the present invention.

FIG. 3 is a flowchart of a method for coding a MATRIX according to an embodiment of the present invention. As shown in FIG. 3, the method according to this embodiment includes the following:

Step 301: Perform, according to a size of a MATRIX in a MATRIX set and in a coding order, coding on the MATRIX in the MATRIX set one by one to obtain a reconstruction MATRIX of the MATRIX, and perform corresponding sampling processing on the reconstruction MATRIX of the MATRIX to obtain a sampling MATRIX.

In this embodiment, the MATRIX set includes a plurality of matrices having different sizes, for example, includes a MATRIX having a size of 4×4, a MATRIX of 8×8, a MATRIX of 16×16, a MATRIX of 32×32, and the like. The MATRIX in the MATRIX set may be a QM, a scaling MATRIX, a coefficient weighting MATRIX, a transform-domain MATRIX after the QM is transformed, a transform-domain MATRIX after the scaling MATRIX is transformed, a transform-domain MATRIX after the coefficient weighting MATRIX is transformed, a prediction residual MATRIX after coding prediction is performed on the QM, a prediction residual MATRIX after coding prediction is performed on the scaling MATRIX, or a prediction residual MATRIX after coding prediction is performed on the coefficient weighting MATRIX.

In this embodiment, the matrices in the MATRIX set are sorted for coding according to sizes of the matrices, which may be in ascending order or in descending order; and coding prediction is performed on the matrices in the coding order to obtain a reconstruction MATRIX of each MATRIX, and then sampling processing is performed on the reconstruction MATRIX of each MATRIX to obtain a sampling MATRIX. A sampling method used for the sampling processing is related to the coding order. If the coding order is the ascending order, the sampling processing refers to upsampling, and the obtained sampling MATRIX is a MATRIX having a size greater than that of a current MATRIX; and if the coding order is the descending order, the sampling processing refers to downsampling, and the obtained sampling MATRIX is a MATRIX having a size less than that of the current MATRIX. For example, a 32×32 sampling MATRIX is obtained by performing upsampling on a reconstruction MATRIX of a 16×16 MATRIX; and an 8×8 sampling MATRIX is obtained by performing downsampling on a reconstruction MATRIX of a 16×16 MATRIX.

In this embodiment, a manner in which coding prediction is performed on the MATRIX is not limited.

Step 302: Obtain a first error based on a reconstruction MATRIX of a current MATRIX and the current MATRIX, and obtain a second error based on a sampling MATRIX and the current MATRIX, where the sampling MATRIX is obtained by performing sampling processing on a reconstruction MATRIX of a MATRIX that is coded in the coding order before the current MATRIX.

After obtaining the reconstruction MATRIX of the current MATRIX and the sampling MATRIX obtained by performing sampling processing on the reconstruction MATRIX of the MATRIX that is coded in the coding order before the current MATRIX, the reconstruction MATRIX of the current MATRIX is compared with the current MATRIX itself to obtain the first error, and the sampling MATRIX is compared with the current MATRIX itself to obtain the second error.

A process of comparing two matrices to obtain an error primarily refers to comparing element values of the two matrices at corresponding positions, obtaining a difference of element values at all positions, and then averaging the differences of the element values at all positions to obtain the error between the two matrices.

Step 303: Compare the first error with the second error, determine whether the first error is less than or equal to the second error, and if a determining result is yes, perform step 304; if the determining result is no, perform step 305. This step is intended to find one MATRIX having a smaller error with the current MATRIX itself.

In an example where coding is performed in ascending order one by one on a 4×4 MATRIX, an 8×8 MATRIX, a 16×16 MATRIX, and a 32×32 MATRIX, when the 8×8 MATRIX is being coded, the 8×8 MATRIX is a current MATRIX, the 4×4 MATRIX is a MATRIX that is coded before the 8×8 MATRIX, and a sampling MATRIX corresponding to the 8×8 MATRIX may be obtained by performing upsampling on a reconstruction MATRIX of the 4×4 MATRIX. For example, assuming that a reconstruction MATRIX A of a 4×4 MATRIX is [0,1,2,3,4,5,6,7], a sampling MATRIX B of 8×8 MATRIX obtained through upsampling is [0,0,2,2,4,4,5,5,6,6,7,7]. A one-dimensional example is used in the description herein; however, the reconstruction MATRIX and the sampling MATRIX are actually two-dimensional.

Step 304: Use the reconstruction MATRIX of the current MATRIX as a coding reconstruction MATRIX corresponding to the current MATRIX, and write a coding result corresponding to the current MATRIX into a bit stream.

If the first error is less than or equal to the second error, the error obtained by comparing the reconstruction MATRIX of the current MATRIX with the current MATRIX is smaller, therefore the reconstruction MATRIX of the current MATRIX is used as the coding reconstruction MATRIX of the current MATRIX, and coded data corresponding to the current MATRIX is coded and then written into the bit stream.

Step 305: Use the sampling MATRIX, obtained by performing sampling processing on the reconstruction MATRIX of the MATRIX that is coded in the coding order before the current MATRIX, as a coding reconstruction MATRIX corresponding to the current MATRIX, and write a coding result corresponding to the current MATRIX into the bit stream.

If the first error is greater than the second error, the error between the sampling MATRIX obtained by performing sampling processing on the reconstruction MATRIX of the MATRIX that is coded in the coding order before the current MATRIX and the current MATRIX is smaller, therefore the sampling MATRIX obtained by performing sampling processing on the reconstruction MATRIX of the MATRIX that is coded in the coding order before the current MATRIX is used as the coding reconstruction MATRIX of the current MATRIX, and coded data corresponding to the current MATRIX is coded and then written into the bit stream.

The current MATRIX refers to a MATRIX on which coding is being performed in the coding order. After all matrices in the MATRIX set are coded, the entire MATRIX set is coded.

When each MATRIX is being coded, after the coding reconstruction MATRIX of each MATRIX is obtained, coded data corresponding to each MATRIX may be coded and written into the bit stream. In addition, it is also allowed to obtain the coding reconstruction MATRIX of each MATRIX by performing coding first, and then code coded data of each MATRIX together and write the coded data into the bit stream.

In this embodiment, coding prediction is performed on each MATRIX to be coded in a MATRIX set to obtain a reconstruction MATRIX, which is then compared with a sampling MATRIX obtained by performing sampling processing on a reconstruction MATRIX of a MATRIX that is coded before; a MATRIX having a smaller error is used as a coding reconstruction MATRIX of a current MATRIX; and then coding is performed on coded data of the current MATRIX. This may improve a coding compression ratio on one hand, and may further ensure coding accuracy on the other hand.

One specific implementation manner of step 301 includes: performing coding processing on the matrices in the MATRIX set in ascending order of MATRIX sizes. When a MATRIX is being coded, the MATRIX is a current MATRIX. The performing coding processing on each MATRIX in the MATRIX set includes: performing coding prediction on a MATRIX in the MATRIX set; obtaining a reconstruction MATRIX of the MATRIX; and performing upsampling on the reconstruction MATRIX of the MATRIX to obtain a sampling MATRIX, where a coding reconstruction MATRIX of a minimum MATRIX is a reconstruction MATRIX of the minimum MATRIX. For example, performing coding on a MATRIX set including a 4×4 MATRIX, an 8×8 MATRIX, a 16×16 MATRIX, and a 32×32 MATRIX refers to performing coding on the 4×4 MATRIX, the 8×8 MATRIX, the 16×16 MATRIX, and the 32×32 MATRIX in ascending order one by one. A minimum MATRIX is the 4×4 MATRIX. Because the minimum MATRIX has no corresponding sampling MATRIX, a reconstruction MATRIX of the minimum MATRIX is directly used as a coding reconstruction MATRIX of the minimum MATRIX. A sampling MATRIX corresponding to the 8×8 MATRIX is obtained by performing upsampling on the reconstruction MATRIX of the 4×4 MATRIX, and has a size of 8×8. A sampling MATRIX corresponding to the 16×16 MATRIX is obtained by performing upsampling on a reconstruction MATRIX of the 8×8 MATRIX, and has a size of 16×16. A sampling MATRIX corresponding to the 32×32 MATRIX is obtained by performing upsampling on a reconstruction MATRIX of the 16×16 MATRIX, and has a size of 32×32.

Another specific implementation manner of step 301 includes: performing coding processing on the matrices in the MATRIX set in descending order of MATRIX sizes. When a MATRIX is being coded, the MATRIX is a current MATRIX. The performing coding processing on each MATRIX in the MATRIX set includes: performing coding prediction on a MATRIX in the MATRIX set to obtain a reconstruction MATRIX of the MATRIX, and performing downsampling on the reconstruction MATRIX of the MATRIX to obtain a sampling MATRIX. A coding reconstruction MATRIX of a maximum MATRIX is a reconstruction MATRIX of the maximum MATRIX. For example, performing coding on a MATRIX set including a 4×4 MATRIX, an 8×8 MATRIX, a 16×16 MATRIX, and a 32×32 MATRIX refers to performing coding on the 32×32 MATRIX, the 16×16 MATRIX, the 8×8 MATRIX, and the 4×4 MATRIX in descending order one by one. A maximum MATRIX is the 32×32 MATRIX. Because the maximum MATRIX has no corresponding sampling MATRIX, a reconstruction MATRIX of the maximum MATRIX is directly used as a coding reconstruction MATRIX of the maximum MATRIX. A sampling MATRIX corresponding to the 16×16 MATRIX is obtained by performing downsampling on the reconstruction MATRIX of the 32×32 MATRIX, and has a size of 16×16. A sampling MATRIX corresponding to the 8×8 MATRIX is obtained by performing downsampling on a reconstruction MATRIX of the 16×16 MATRIX, and has a size of 8×8. A sampling MATRIX corresponding to the 4×4 MATRIX is obtained by performing downsampling on a reconstruction MATRIX of the 8×8 MATRIX, and has a size of 4×4. The following describes a downsampling process by using an example where downsampling is performed on an 8×8 reconstruction MATRIX to obtain a 4×4 sampling MATRIX. It is assumed that an 8×8 reconstruction MATRIX A is [0,1,2,3,4,5,6,7], and a 4×4 sampling MATRIX B obtained through downsampling is [0,2,4,6]. A one-dimensional example is used for description herein; however, the reconstruction MATRIX and the sampling MATRIX are actually two-dimensional.

Further, this embodiment provides an implementation manner of performing coding prediction on a MATRIX to obtain a reconstruction MATRIX, including: dividing a MATRIX into layers according to a preset quantity of layers, and grouping MATRIX elements in the MATRIX into different layers; and then, performing, according to a determined to-be-coded layer number and in an order of layers one by one, coding processing on MATRIX elements at each layer to be coded, thereby forming a reconstruction MATRIX.

A process of forming the reconstruction MATRIX is a process of obtaining a MATRIX element reconstruction value corresponding to each layer, which specifically includes: if a layer number of a current layer is less than or equal to the to-be-coded layer number, using an original MATRIX element value corresponding to the current layer as a MATRIX element reconstruction value corresponding to the current layer; and if the layer number of the current layer is greater than the to-be-coded layer number, using a MATRIX element predicted value corresponding to the current layer as the MATRIX element reconstruction value corresponding to the current layer.

The MATRIX element predicted value corresponding to the current layer is obtained by performing an interpolation calculation on a reconstruction value or a predicted value of a coded MATRIX element at a layer that is coded before the current layer and at the current layer of the MATRIX.

The foregoing implementation manner of forming the reconstruction MATRIX implements reconstruction by using a layer structure, and reference may be made to the description of the method for coding a MATRIX illustrated in FIG. 1A for a specific implementation manner. A difference lies in that in this implementation manner, the MATRIX element reconstruction value corresponding to each layer is obtained instead of directly performing coding processing.

Based on the foregoing description, after the reconstruction MATRIX of the MATRIX that is being coded currently (that is, current) is obtained, it is determined whether the reconstruction MATRIX is a coding reconstruction MATRIX of the current MATRIX by comparing the error between the reconstruction MATRIX and the current MATRIX with the error between the sampling MATRIX and the current MATRIX, where the sampling MATRIX is obtained by performing sampling on the reconstruction MATRIX of the MATRIX that is coded before the current MATRIX.

If it is determined that the reconstruction MATRIX of the current MATRIX is the coding reconstruction MATRIX corresponding to the current MATRIX, that is, the first error is less than or equal to the second error, a process of writing the coding result corresponding to the current MATRIX into the bit stream includes: writing, into the bit stream, an indicator bit for indicating whether the current MATRIX uses a sampling MATRIX, where the indicator bit indicates that the current MATRIX uses no sampling MATRIX; writing, into the bit stream, residual data, which is obtained by performing a calculation on a MATRIX element reconstruction value corresponding to each layer having a layer number less than or equal to the to-be-coded layer number and a MATRIX element predicted value corresponding to each layer having the layer number less than or equal to the to-be-coded layer number in the current MATRIX, as 0 coded data of each layer having the layer number less than or equal to the to-be-coded layer number; writing, into the bit stream, no coded data of each layer having a layer number greater than the to-be-coded layer number in the current MATRIX; and writing, into the bit stream, the to-be-coded layer number. The manner of coding the residual data and writing the coded residual data into the bit stream, or writing no coded data into the bit stream, greatly improves a compression ratio of the MATRIX and may reduce a bit rate occupied for transmitting the MATRIX.

Further, in the foregoing process, coded data of a layer having a small layer number may be large, which is generally normal distribution with 0 as a mean value. Therefore, variable-length code coding may be performed on the coded data of the layer having the small layer number and the coded data after the variable-length code coding may be written into the bit stream. Coded data of a layer having a large layer number may be mostly 0; therefore, run-length coding is performed on the coded data of the layer having the large layer number and the coded data after the run-length coding is written into the bit stream. In this embodiment, a layer number threshold is set in advance for determining whether each layer having a layer number less than or equal to the to-be-coded layer number is a layer having a small layer number. If a layer among the layers having layer numbers less than or equal to the to-be-coded layer number is less than or equal to the set layer number threshold, the layer is a layer having a small layer number; therefore, variable-length code coding is performed on coded data of the layer and the coded data after the variable-length code coding is written into the bit stream; and if a layer among the layers having layer numbers less than or equal to the to-be-coded layer number is greater than the set layer number threshold, the layer is a layer having a large layer number; therefore, run-length coding is performed on coded data of the layer and the coded data after the run-length coding is written into the bit stream.

Still further, in the foregoing process of writing the coding result corresponding to the current MATRIX into the bit stream, it may be first determined whether the MATRIX is in symmetrical mode; and if the MATRIX is in symmetrical mode, it is determined to transmit a coding result corresponding only to a half of the MATRIX, and write, into the bit stream, an indicator bit for indicating whether the current MATRIX is a symmetrical MATRIX, where the indicator bit indicates that the current MATRIX is a symmetrical MATRIX. In this case, coding may be performed on each layer by performing coding only on a half of MATRIX elements at each layer, which further improves a compression ratio for the MATRIX, reduces a volume of the bit stream to be transmitted, and reduces a bit rate occupied for transmitting the MATRIX.

If it is determined that the sampling MATRIX obtained by performing sampling on the reconstruction MATRIX of the MATRIX that is coded in the coding order before the current MATRIX is the coding reconstruction MATRIX corresponding to the current MATRIX, a process of writing the coding result corresponding to the current MATRIX into the bit stream includes: writing an indicator bit for indicating whether the current MATRIX uses a sampling MATRIX into the bit stream, where the indicator bit indicates that the current MATRIX uses a sampling MATRIX, and writing no coded data corresponding to the current MATRIX into the bit stream. Generally, the indicator bit is only one bit, and a data volume is small, which improves the compression ratio for the MATRIX and may also reduce the bit rate occupied for transmitting the MATRIX.

Further, when HEVC block sizes are 4×4, 8×8, 16×16, and 32×32, intra-frame/inter-frame, and luma/chroma U/chroma V components, each frame of data corresponds to 24 QMs that form one quantization MATRIX set (QM Set). When more block sizes are available, the quantization MATRIX set may have more QMs. By combining intra-frame and inter-frame with luma, chroma U, and chroma V respectively, six micro MATRIX sets including 4×4, 8×8, 16×16, and 32×32 may be obtained. That is, the quantization MATRIX set includes six micro MATRIX sets, where each micro MATRIX set includes four MATRIX sizes.

Coding processing is performed on each micro MATRIX set by using the coding method according to the foregoing embodiment. For a set of different matrices, coding processing is performed first according to sizes of the matrices; for matrices having a same size, coding processing is performed in an order of intra-frame before inter-frame; and for a same intra-frame or inter-frame MATRIX, coding processing is performed in an order of luma before chroma. In other words, the plurality of matrices in the quantization MATRIX set are processed in an order of MATRIX sizes, intra-frame before inter-frame, and luma before chroma one by one.

For example, when coding processing is performed in descending order, coding processing is performed on an intra-frame 32×32 luma MATRIX first. Specifically, coding prediction is performed on the intra-frame 32×32 luma MATRIX to obtain a reconstruction MATRIX of the intra-frame 32×32 luma MATRIX, where the reconstruction MATRIX is used as a coding reconstruction MATRIX of the intra-frame 32×32 luma MATRIX; and then downsampling is performed on the reconstruction MATRIX of the intra-frame 32×32 luma MATRIX to obtain an intra-frame 16×16 luma sampling MATRIX. Then, coding processing is performed on an intra-frame 32×32 chroma U MATRIX. Specifically, coding prediction is performed on the intra-frame 32×32 chroma U MATRIX to obtain a reconstruction MATRIX of the intra-frame 32×32 chroma U MATRIX, where the reconstruction MATRIX is used as a coding reconstruction MATRIX of the intra-frame 32×32 chroma U MATRIX; and then downsampling is performed on the reconstruction MATRIX of the intra-frame 32×32 chroma U MATRIX to obtain an intra-frame 16×16 chroma U sampling MATRIX. Similarly, coding processing is performed on an intra-frame 32×32 chroma V MATRIX. Then, coding processing is performed on an inter-frame 32×32 luma MATRIX, 32×32 chroma U MATRIX, and 32×32 chroma V MATRIX one by one.

Next, coding processing is performed on the intra-frame 16×16 luma MATRIX. Specifically, coding prediction is performed on the intra-frame 16×16 luma MATRIX to obtain a reconstruction MATRIX of the intra-frame 16×16 luma MATRIX; the reconstruction MATRIX and the intra-frame 16×16 luma sampling MATRIX obtained by performing downsampling on the reconstruction MATRIX of the intra-frame 32×32 luma MATRIX are respectively compared with the intra-frame 16×16 luma MATRIX to obtain two errors; the two errors are compared and one MATRIX having a smaller error is used as a coding reconstruction MATRIX of the intra-frame 16×16 luma MATRIX; and then downsampling is performed on the reconstruction MATRIX of the intra-frame 16×16 luma MATRIX to obtain an intra-frame 8×8 luma sampling MATRIX. Then, coding processing is performed on an intra-frame 16×16 chroma U MATRIX, an intra-frame 16×16 chroma V MATRIX, an inter-frame 16×16 luma MATRIX, an inter-frame 16×16 chroma U MATRIX, and an inter-frame 16×16 chroma V MATRIX one by one.

Matrices in the quantization MATRIX are coded one by one in the foregoing manner until all the matrices are coded.

When coding processing is performed in ascending order, coding processing is performed on an intra-frame 4×4 luma MATRIX first. Then, coding processing is performed on an intra-frame 4×4 chroma U MATRIX, an intra-frame 4×4 chroma V MATRIX, an inter-frame 4×4 luma MATRIX, an inter-frame 4×4 chroma U MATRIX, and an inter-frame 4×4 chroma V MATRIX one by one.

Next, coding processing is performed on an intra-frame 8×8 luma MATRIX, an intra-frame 8×8 chroma U MATRIX, an intra-frame 8×8 chroma V MATRIX, an inter-frame 8×8 luma MATRIX, an inter-frame 8×8 chroma U MATRIX, and an inter-frame 8×8 chroma V MATRIX one by one. A sampling MATRIX corresponding to the intra-frame 8×8 luma MATRIX is obtained by performing upsampling on the reconstruction MATRIX of the intra-frame 4×4 luma MATRIX; a sampling MATRIX corresponding to the intra-frame 8×8 chroma U MATRIX is obtained by performing upsampling on the reconstruction MATRIX of the intra-frame 4×4 chroma U MATRIX; a sampling MATRIX corresponding to the intra-frame 8×8 chroma V MATRIX is obtained by performing upsampling on the reconstruction MATRIX of the intra-frame 4×4 chroma V MATRIX; a sampling MATRIX corresponding to the inter-frame 8×8 luma MATRIX is obtained by performing upsampling on the reconstruction MATRIX of the inter-frame 4×4 luma MATRIX; a sampling MATRIX corresponding to the inter-frame 8×8 chroma U MATRIX is obtained by performing upsampling on the reconstruction MATRIX of the inter-frame 4×4 chroma U MATRIX; and a sampling MATRIX corresponding to the inter-frame 8×8 chroma V MATRIX is obtained by performing upsampling on the reconstruction MATRIX of the inter-frame 4×4 chroma V MATRIX.

Next, coding processing is performed on an intra-frame 16×16 luma MATRIX, an intra-frame 16×16 chroma U MATRIX, an intra-frame 16×16 chroma V MATRIX, an inter-frame 16×16 luma MATRIX, an inter-frame 16×16 chroma U MATRIX, and an inter-frame 16×16 chroma V MATRIX one by one.

Finally, coding processing is performed on an intra-frame 32×32 luma MATRIX, an intra-frame 32×32 chroma U MATRIX, an intra-frame 32×32 chroma V MATRIX, an inter-frame 32×32 luma MATRIX, an inter-frame 32×32 chroma U MATRIX, and an inter-frame 32×32 chroma V MATRIX one by one.

Figure 4:
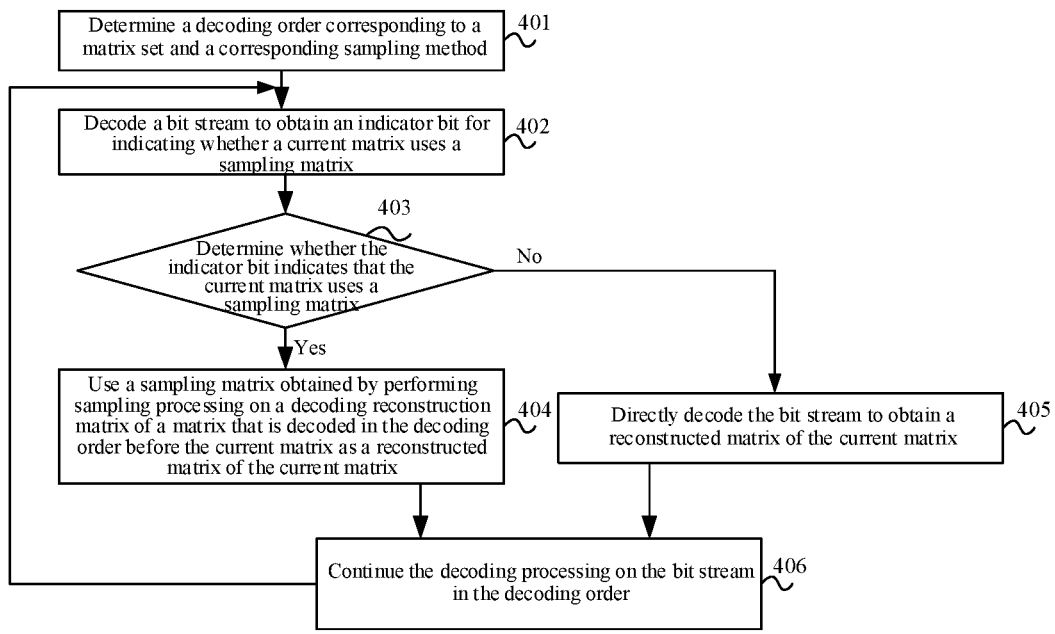
FIG. 4 is a flowchart of a method for decoding a MATRIX according to an embodiment of the present invention.

FIG. 4 is a flowchart of a method for decoding a MATRIX according to an embodiment of the present invention. As shown in FIG. 4, the method according to this embodiment includes the following:

Step 401: Determine a decoding order corresponding to a MATRIX set and a corresponding sampling method.

When decoding a MATRIX set including a plurality of matrices, a decoding end needs to determine an order first for decoding the plurality of matrices in the MATRIX set, for example, an ascending order of MATRIX sizes or a descending order of MATRIX sizes. Moreover, the decoding end further needs to determine a sampling method corresponding to the decoding order. For example, if decoding is performed in ascending order of MATRIX sizes, the sampling method is upsampling; and if decoding is performed in descending order of MATRIX sizes, the sampling method is downsampling.

The decoding end may agree with a coding end in advance upon a coding and decoding order for coding and decoding a MATRIX set and a corresponding sampling method.

In addition, if the coding end uses an indicator bit to indicate a coding order in use and a corresponding sampling method, writes the indicator bit into a bit stream, and sends the bit stream to the decoding end, the decoding end may decode the bit stream to obtain an indicator bit for indicating a decoding order and the corresponding sampling method, thereby determining the decoding order that needs to be used and the corresponding sampling method. For example, when an indicator bit 1 is obtained through the decoding, decoding is to be performed in ascending order of MATRIX sizes and an upsampling method is to be used; and when an indicator bit 0 is obtained through the decoding, decoding is to be performed in descending order of MATRIX sizes and a downsampling method is to be used.

Step 402: Decode a bit stream to obtain an indicator bit for indicating whether a current MATRIX uses a sampling MATRIX.

Step 403: Determine whether the indicator bit indicates that the current MATRIX uses a sampling MATRIX; if a determining result is yes, perform step 404; and if the determining result is no, perform step 405.

The decoding end may determine, according to a value of the indicator bit obtained through the decoding, whether the current MATRIX uses a sampling MATRIX. For example, an indicator bit 1 indicates that the current MATRIX uses a sampling MATRIX as a decoding reconstruction MATRIX of the current MATRIX; and an indicator bit 0 indicates that the current MATRIX uses no sampling MATRIX as the decoding reconstruction MATRIX of the current MATRIX.

Step 404: Use a sampling MATRIX obtained by performing sampling processing on a decoding reconstruction MATRIX of a MATRIX that is decoded in the decoding order before the current MATRIX as a decoding reconstruction MATRIX of the current MATRIX, and perform step 406.

When the current MATRIX uses a sampling MATRIX, the decoding end performs sampling processing on the decoding reconstruction MATRIX of the MATRIX that is decoded in the decoding order before the current MATRIX to obtain the sampling MATRIX, and then uses the obtained sampling MATRIX as the decoding reconstruction MATRIX of the current MATRIX. For example, when decoding is performed in ascending order of MATRIX sizes, the decoding end may perform upsampling on a decoding reconstruction MATRIX of a decoded 4×4 MATRIX to obtain a sampling MATRIX, and then use the obtained sampling MATRIX as a decoding reconstruction MATRIX of an 8×8 MATRIX, which, however, is not limited to using a MATRIX that is decoded before the current MATRIX and is adjacent to the current MATRIX.

Step 405: Directly decode the bit stream to obtain a decoding reconstruction MATRIX of the current MATRIX, and perform step 406.

When the current MATRIX uses no sampling MATRIX, the decoding end decodes the bit stream in the decoding order to obtain coded data of the current MATRIX, and obtains the decoding reconstruction MATRIX of the current MATRIX according to the coded data obtained through the decoding.

When the current MATRIX is coded by the coding end by using a layer structure, a process for the decoding end to decode the bit stream to obtain the decoding reconstruction MATRIX of the current MATRIX is: decoding, by the decoding end, the bit stream to obtain a layer number of a coded layer of the current MATRIX, and decoding bit stream data corresponding to the current MATRIX to obtain coded data of each layer having a layer number less than or equal to the to-be-coded layer number, in the current MATRIX; then, obtaining, according to the to-be-coded layer number, which is obtained through the decoding, and the coded data of each layer having the layer number less than or equal to the to-be-coded layer number, a MATRIX element reconstruction value corresponding to each layer having the layer number less than or equal to the to-be-coded layer number, in the current MATRIX, in an order of layers (that is, decoding a low layer before decoding a high layer) one by one; next, obtaining, by the decoding end by performing an interpolation calculation on the MATRIX element reconstruction value corresponding to the layer having the layer number less than or equal to the to-be-coded layer number in the current MATRIX, a MATRIX element reconstruction value corresponding to each layer having a layer number greater than the to-be-coded layer number in the current MATRIX. An interpolation method in use and an interpolation order correspond to the coding process in the coding end. For example, the interpolation method may be a uniform interpolation method or a weighted interpolation method; and the interpolation order may be horizontally before vertically, or vertically before horizontally.

After the MATRIX element reconstruction value corresponding to each layer in the current MATRIX is obtained, a decoding reconstruction MATRIX of the current MATRIX is obtained.

In the foregoing process, a process for the decoding end to decode the bit stream to obtain the coded data of each layer having the layer number less than or equal to the to-be-coded layer number, in the current MATRIX includes: performing, if the layer number of each layer having the layer number less than or equal to the to-be-coded layer number is less than or equal to a set layer number threshold, variable-length decoding on the bit stream corresponding to each layer having the layer number less than or equal to the to-be-coded layer number, thereby obtaining the coded data of each layer having the layer number less than or equal to the to-be-coded layer number; and performing, if the layer number is greater than the layer number threshold, run-length decoding on the bit stream corresponding to each layer having the layer number less than or equal to the to-be-coded layer number, thereby obtaining the coded data of each layer having the layer number less than or equal to the to-be-coded layer number. The decoding process corresponds to the coding end.

Step 406: Continue the decoding processing on the bit stream in the decoding order, and switch to perform step 402, thereby decoding the bit stream to obtain all decoding reconstruction matrices of all matrices in the MATRIX set one by one.

The method for decoding a MATRIX according to this embodiment corresponds to the method for coding a MATRIX illustrated in FIG. 3. Firstly, a decoding order and a corresponding sampling method are determined, and an indicator bit is obtained by decoding a bit stream; and then a manner of obtaining a decoding reconstruction MATRIX of each MATRIX in a MATRIX set is determined, where when the indicator bit indicates that a current MATRIX uses a sampling MATRIX, no coded data of the current MATRIX exists in the bit stream, which improves a ratio for a coding end to compress the MATRIX and reduces a bit rate occupied for transmitting the MATRIX.

Figure 5A:
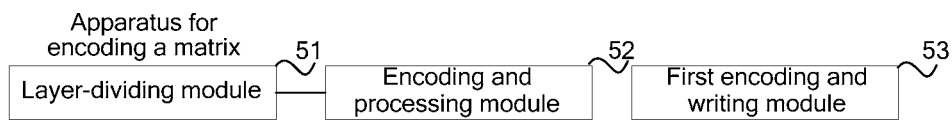
FIG. 5A is a schematic structural diagram of an apparatus for coding a MATRIX according to an embodiment of the present invention.

FIG. 5A is a schematic structural diagram of an apparatus for coding a MATRIX according to an embodiment of the present invention. As shown in FIG. 5A, the apparatus according to this embodiment includes a layer-dividing module 51, a coding and processing module 52, and a first coding and writing module 53.

The layer-dividing module 51 is configured to divide a MATRIX into layers according to a preset quantity of layers, and group MATRIX elements into different layers.

The coding and processing module 52 is connected to the layer-dividing module 51, and is configured to perform, according to a determined to-be-coded layer number and in an order of layers one by one, coding processing on MATRIX elements at each layer to be coded. A layer on which coding is being performed is referred to as a current layer. If a layer number of the current layer is less than or equal to the to-be-coded layer number, the coding and processing module 52 obtains residual data by performing a calculation according to an original MATRIX element value corresponding to the current layer and a MATRIX element predicted value corresponding to the current layer, and writes the residual data as coded data of the current layer into a bit stream. If the layer number of the current layer is greater than the to-be-coded layer number, the coding and processing module 52 writes no coded data of the current layer into the bit stream. The MATRIX element predicted value corresponding to the current layer is obtained by performing an interpolation calculation on a MATRIX element reconstruction value or a MATRIX element predicted value of a coded MATRIX element at a layer that is coded before the current layer and at the current layer of the MATRIX.

The first coding and writing module 53 is configured to code the to-be-coded layer number and write the coded layer number into the bit stream.

Functional modules of the apparatus for coding a MATRIX according to this embodiment may be configured to implement a procedure of the method for coding a MATRIX illustrated in FIG. 1A. A specific operating principle thereof is not described again, and reference may be made to the description of the method embodiment for details.

In this embodiment, the MATRIX that is coded by the apparatus for coding a MATRIX may be any one or a combination of a QM, a scaling MATRIX, a coefficient weighting MATRIX, a transform-domain MATRIX after the QM is transformed, a transform-domain MATRIX after the scaling MATRIX is transformed, a transform-domain MATRIX after the coefficient weighting MATRIX is transformed, a prediction residual data MATRIX after coding prediction is performed on the QM, a prediction residual MATRIX after coding prediction is performed on the scaling MATRIX, or a prediction residual MATRIX after coding prediction is performed on the coefficient weighting MATRIX. The transform may be Z-transform, DCT transform, DFT transform, or the like. The coding prediction refers to coding a QM, a scaling MATRIX, a coefficient weighting MATRIX, or the like, and then obtaining a residual between the MATRIX after coding and the MATRIX before coding (that is, an original MATRIX on which no coding is performed). A coding method, for example, DPCM, for performing the coding prediction, is not limited.

The apparatus for coding a MATRIX according to this embodiment divides a MATRIX to be coded into layers, and according to a determined to-be-coded layer number, obtains residual data as coded data and writes the coded data into a bit stream or writes no coded data into a bit stream, which implements layered coding and transmission of the MATRIX, improves a compression ratio of the MATRIX, and reduces a bit rate occupied for transmitting the MATRIX.

Figure 5B:
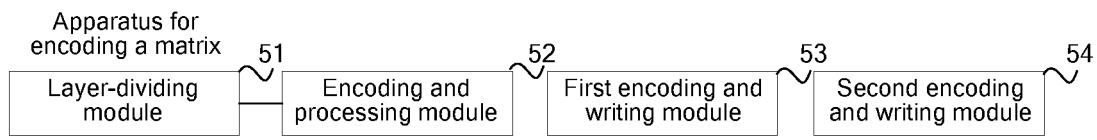
FIG. 5B is a schematic structural diagram of an apparatus for coding a MATRIX according to another embodiment of the present invention.

FIG. 5B is a schematic structural diagram of an apparatus for coding a MATRIX according to another embodiment of the present invention. This embodiment is implemented based on the embodiment illustrated in FIG. 5A. As shown in FIG. 5B, the apparatus for coding a MATRIX according to this embodiment further includes a second coding and writing module 54.

The second coding and writing module 54 is configured to code a preset quantity of layers and a dividing method for dividing a MATRIX into layers, and write the coded preset quantity and the coded dividing method into the bit stream, or the second coding and writing module 54 is configured to code a dividing method for dividing a MATRIX into layers and write the coded dividing method into the bit stream. The dividing method is a grouping method for grouping MATRIX elements of the MATRIX into different layers.

In this embodiment, the coding and processing module 52 is specifically configured to perform, according to a determined to-be-coded layer number, layered coding on the MATRIX elements in a manner of coding a low layer before coding a high layer.

The coding and processing module 52 is specifically configured to obtain a MATRIX element predicted value corresponding to a current layer by performing a uniform interpolation calculation or a weighted interpolation calculation on a MATRIX element reconstruction value or a MATRIX element predicted value of a coded MATRIX element at a layer that is coded before the current layer and at the current layer of the MATRIX.

In addition, the coding and processing module 52 is further specifically configured to obtain the MATRIX element predicted value corresponding to the current layer by performing, in an order of performing interpolation horizontally before vertically or in an order of performing interpolation vertically before horizontally, an interpolation calculation on the MATRIX element reconstruction value or the MATRIX element predicted value of the coded MATRIX element at the layer that is coded before the current layer and at the current layer of the MATRIX.

Further, the coding and processing module 52 is specifically configured to perform, when a layer number of the current layer is less than or equal to a set layer number threshold, variable-length code coding on coded data of the current layer and write the coded data after the variable-length code coding into the bit stream, and perform, when the layer number of the current layer is greater than the layer number threshold, run-length coding on the coded data of the current layer and write the coded data after the variable-length code coding into the bit stream.

For a specific working procedure of the coding and processing module 52, reference may be made to the corresponding description in the method embodiment illustrated in FIG. 1A, which is not described herein again.

The apparatus for coding a MATRIX according to this embodiment writes, by using the second coding and writing module, a quantity of layers and/or a dividing method into the bit stream, so as to provide a decoding end with information required for performing decoding, which improves flexibility for dividing a MATRIX.

Figure 6A:
FIG. 6A is a schematic structural diagram of an apparatus for decoding a MATRIX according to an embodiment of the present invention.

FIG. 6A is a schematic structural diagram of an apparatus for decoding a MATRIX according to an embodiment of the present invention. As shown in FIG. 6A, the apparatus according to this embodiment includes a layer quantity decoding module 61, a first reconstructing module 62, and a second reconstructing module 63.

The layer quantity decoding module 61 is configured to decode a bit stream to obtain the to-be-coded layer number of a MATRIX, where the to-be-coded layer number is a number of a coded layer, which is determined and written into the bit stream by the coding end.

The first reconstructing module 62 is connected to the layer quantity decoding module 61, and is configured to obtain, according to the to-be-coded layer number and coded data of each layer in the MATRIX, which has a layer number less than or equal to the to-be-coded layer number, where the coded data is obtained by decoding the bit stream, a MATRIX element reconstruction value corresponding to each layer having the layer number less than or equal to the to-be-coded layer number in an order of layers one by one.

The second reconstructing module 63 is connected to the first reconstructing module 62, and is configured to obtain, by performing a calculation on the MATRIX element reconstruction value corresponding to the layer having the layer number less than or equal to the to-be-coded layer number, a MATRIX element reconstruction value corresponding to each layer having a layer number greater than the to-be-coded layer number.

Functional modules of the apparatus for decoding a MATRIX according to this embodiment may be configured to implement a procedure of the method for decoding a MATRIX illustrated in FIG. 2. A specific operating principle thereof is not described again, and reference may be made to the description of the method embodiment for details.

In this embodiment, the MATRIX that is decoded by the apparatus for decoding a MATRIX may be any one or a combination of a QM, a scaling MATRIX, a coefficient weighting MATRIX, a transform-domain MATRIX after the QM is transformed, a transform-domain MATRIX after the scaling MATRIX is transformed, a transform-domain MATRIX after the coefficient weighting MATRIX is transformed, a prediction residual MATRIX after coding prediction is performed on the QM, a prediction residual MATRIX after coding prediction is performed on the scaling MATRIX, or a prediction residual MATRIX after coding prediction is performed on the coefficient weighting MATRIX. The transform may be Z-transform, DCT transform, DFT transform, or the like. The coding prediction refers to coding a QM, a scaling MATRIX, a coefficient weighting MATRIX, or the like, and then obtaining a residual between the MATRIX after coding and the MATRIX before coding (that is, an original MATRIX on which no coding is performed). A coding method, for example, DPCM, for performing the coding prediction, is not limited.

The apparatus for decoding a MATRIX according to this embodiment operates in cooperation with the apparatus for coding a MATRIX illustrated in FIG. 5A; after obtaining a layer number of a coded layer from a bit stream, decodes, according to the to-be-coded layer number and coded data of each layer having a layer number less than or equal to the to-be-coded layer number, where the coded data is obtained by decoding the bit stream, the bit stream to obtain a MATRIX element reconstruction value corresponding to each layer one by one, thereby implementing reconstruction of the MATRIX. The apparatus for coding a MATRIX is allowed to code a MATRIX by using a layer structure, which improves a compression ratio of the MATRIX and reduces a bit rate occupied for transmitting the MATRIX.

Figure 6B:
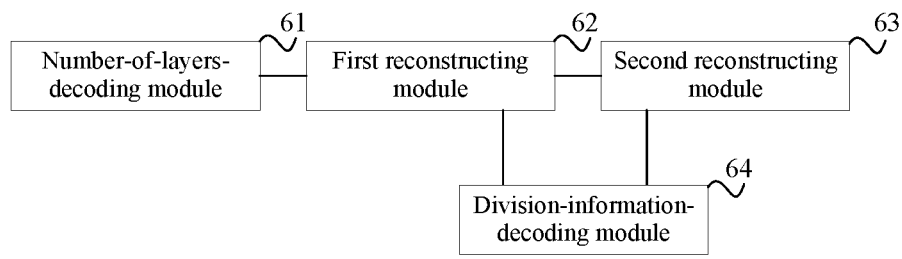
FIG. 6B is a schematic structural diagram of an apparatus for decoding a MATRIX according to another embodiment of the present invention.

FIG. 6B is a schematic structural diagram of an apparatus for decoding a MATRIX according to another embodiment of the present invention. This embodiment is implemented based on the embodiment illustrated in FIG. 6A. As shown in FIG. 6B, the apparatus according to this embodiment further includes a division-information-decoding module 64.

The division-information-decoding module 64 is configured to decode a bit stream to obtain a quantity of layers of a MATRIX and a corresponding dividing method, and provide a first reconstructing module 62 and a second reconstructing module 63 with the obtained quantity and the obtained corresponding dividing method; or the division-information-decoding module 64 is configured to decode a bit stream to obtain a dividing method, and provide a first reconstructing module 62 and a second reconstructing module 63 with the obtained dividing method; or the division-information-decoding module 64 is configured to decode a bit stream to obtain a quantity of layers, and provide a first reconstructing module 62 and a second reconstructing module 63 with the obtained quantity. The dividing method is a grouping method for grouping MATRIX elements of the MATRIX into different layers.

Further, the second reconstructing module 63 according to this embodiment is specifically configured to obtain, by performing a uniform interpolation calculation or a weighted interpolation calculation on a MATRIX element reconstruction value corresponding to a layer having a layer number less than or equal to the to-be-coded layer number, a MATRIX element reconstruction value corresponding to each layer having a layer number greater than the to-be-coded layer number.

The second reconstructing module 63 according to this embodiment is further specifically configured to obtain, by performing the calculation on the MATRIX element reconstruction value corresponding to the layer having the layer number less than or equal to the to-be-coded layer number in an order of performing interpolation horizontally before vertically or in an order of performing interpolation vertically before horizontally, the MATRIX element reconstruction value corresponding to each layer having the layer number greater than the to-be-coded layer number.

The first reconstructing module 62 is specifically configured to perform, when a layer number of a current layer on which decoding is being performed is less than or equal to a set layer number threshold, variable-length decoding on a bit stream corresponding to the current layer to obtain coded data of the current layer, and perform, when the layer number of the current layer on which decoding is being performed is greater than the layer number threshold, run-length decoding on the bit stream corresponding to the current layer to obtain the coded data of the current layer, and then obtain, according to the to-be-coded layer number and coded data of each layer in the MATRIX, which has a layer number less than or equal to the to-be-coded layer number, where the coded data is obtained by decoding the bit stream, a MATRIX element reconstruction value corresponding to each layer having the layer number less than or equal to the to-be-coded layer number in an order of layers one by one.

For a specific operating principle of the foregoing functional modules, reference may be made to a corresponding procedure in the method illustrated in FIG. 2, which is not described repeatedly herein.

The apparatus for decoding a MATRIX according to this embodiment operates in cooperation with the apparatus for coding a MATRIX illustrated in FIG. 5A or FIG. 5B; after obtaining a layer number of a coded layer from a bit stream, the apparatus for decoding a MATRIX decodes the bit stream to obtain a MATRIX element reconstruction value corresponding to each layer one by one according to the to-be-coded layer number and coded data of each layer having the layer number less than or equal to the to-be-coded layer number, where the coded data is obtained by decoding the bit stream, thereby implementing reconstruction of the MATRIX. The apparatus for coding a MATRIX is allowed to code a MATRIX by using a layer structure, which improves a compression ratio of the MATRIX and reduces a bit rate occupied for transmitting the MATRIX.

Figure 7A:
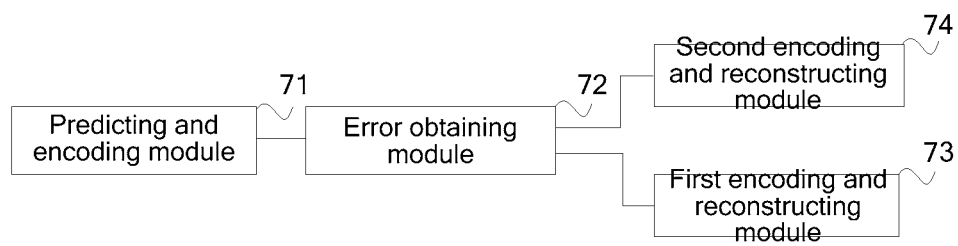
FIG. 7A is a schematic structural diagram of an apparatus for coding a MATRIX according to still another embodiment of the present invention.

FIG. 7A is a schematic structural diagram of an apparatus for coding a MATRIX according to still another embodiment of the present invention. As shown in FIG. 7A, the apparatus according to this embodiment includes a predicting and coding module 71, an error obtaining module 72, a first coding and reconstructing module 73, and a second coding and reconstructing module 74.

The predicting and coding module 71 is configured to perform, according to a size of a MATRIX in a MATRIX set and in a coding order, MATRIX coding on the MATRIX in the MATRIX set one by one to obtain a reconstruction MATRIX of the MATRIX, and perform corresponding sampling processing on the reconstruction MATRIX of the MATRIX to obtain a sampling MATRIX.

The error obtaining module 72 is connected to the predicting and coding module 71, and is configured to obtain a first error based on a reconstruction MATRIX of a current MATRIX and the current MATRIX, and obtain a second error based on a sampling MATRIX and the current MATRIX, where the sampling MATRIX is obtained by performing sampling processing on a reconstruction MATRIX of a MATRIX that is coded in the coding order before the current MATRIX.

The first coding and reconstructing module 73 is connected to the error obtaining module 72, and is configured to use, if the first error obtained by the error obtaining module 72 is less than or equal to the second error, the reconstruction MATRIX of the current MATRIX as a coding reconstruction MATRIX of the current MATRIX, and write a coding result corresponding to the current MATRIX into a bit stream.

The second coding and reconstructing module 74 is connected to the error obtaining module 72, and is configured to use, if the first error obtained by the error obtaining module 72 is greater than the second error, the sampling MATRIX, obtained by performing sampling processing on the reconstruction MATRIX of the MATRIX that is coded in the coding order before the current MATRIX, as the coding reconstruction MATRIX corresponding to the current MATRIX, and write the coding result corresponding to the current MATRIX into the bit stream.

Functional modules of the apparatus for coding a MATRIX according to this embodiment may be configured to implement a procedure of the method for coding a MATRIX illustrated in FIG. 3. A specific operating principle thereof is not described again, and reference may be made to the description of the method embodiment for details.

The apparatus for coding a MATRIX according to this embodiment performs coding prediction on each MATRIX in a MATRIX set in a coding order one by one according to a MATRIX size to obtain a reconstruction MATRIX; performs sampling processing on the reconstruction MATRIX to obtain a sampling MATRIX; and selects a MATRIX having a smaller error as a coding reconstruction MATRIX of a current MATRIX from a reconstruction MATRIX of a MATRIX on which coding is being performed and a sampling MATRIX obtained by performing sampling on a reconstruction MATRIX of a MATRIX that is coded before, and writes a coding result of the current MATRIX into a bit stream, which implements coding on each MATRIX in the MATRIX set, improves a compression ratio of each MATRIX, and reduces a bit rate occupied for transmitting the MATRIX.

Figure 7B:
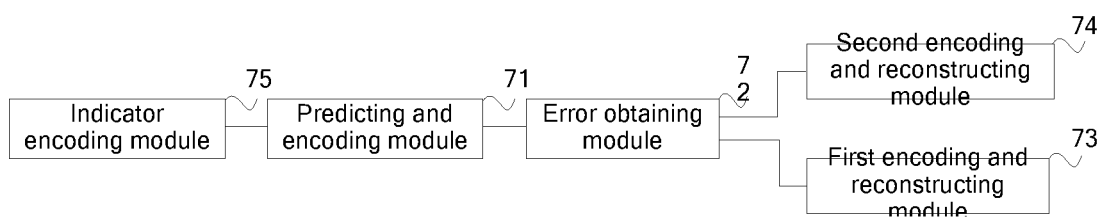
FIG. 7B is a schematic structural diagram of an apparatus for coding a MATRIX according to yet another embodiment of the present invention.

FIG. 7B is a schematic structural diagram of an apparatus for coding a MATRIX according to yet another embodiment of the present invention. This embodiment is implemented based on the embodiment illustrated in FIG. 7A. As shown in FIG. 7B, the apparatus according to this embodiment further includes an indicator coding module 75.

The indicator coding module 75 is configured to write an indicator bit for indicating a coding order and a sampling method in use into a bit stream, and provide a predicting and coding module 71 with the bit stream. The indicator bit is used to indicate whether the coding order is coding a plurality of matrices in descending order or in ascending order of MATRIX sizes one by one, and may further indicate that a sampling method in use is a downsampling method when the coding is performed in descending order of MATRIX sizes, and that the sampling method is an upsampling method when the coding is performed in ascending order of MATRIX sizes.

Further, the predicting and processing module 71 according to this embodiment is specifically configured to perform, in ascending order of MATRIX sizes, coding prediction on a MATRIX in the MATRIX set to obtain a reconstruction MATRIX of the MATRIX, and perform upsampling on the reconstruction MATRIX of the MATRIX to obtain a sampling MATRIX, where a coding reconstruction MATRIX of a minimum MATRIX is a reconstruction MATRIX of the minimum MATRIX, or the predicting and coding module 71 is specifically configured to perform, in descending order of MATRIX sizes, coding prediction on a MATRIX in the MATRIX set to obtain a reconstruction MATRIX of the MATRIX, and perform downsampling on the reconstruction MATRIX of the MATRIX to obtain a sampling MATRIX, where a coding reconstruction MATRIX of a maximum MATRIX is a reconstruction MATRIX of the maximum MATRIX.

Further, the predicting and coding module 71 according to this embodiment is specifically configured to divide the MATRIX into layers according to a preset quantity of layers, group MATRIX elements in the MATRIX into different layers, and perform, according to a determined to-be-coded layer number and in an order of layers one by one, coding processing on the MATRIX elements at each layer to be coded; if a layer number of a current layer is less than or equal to the to-be-coded layer number, use an original MATRIX element value corresponding to the current layer as a MATRIX element reconstruction value corresponding to the current layer; and if the layer number of the current layer is greater than the to-be-coded layer number, use a MATRIX element predicted value corresponding to the current layer as a MATRIX element reconstruction value corresponding to the current layer, thereby implementing coding prediction on the MATRIX to obtain the reconstruction MATRIX of the MATRIX.

The MATRIX element predicted value corresponding to the current layer is obtained by performing an interpolation calculation on a MATRIX element predicted value corresponding to a layer that is coded before the current layer.

Based on the foregoing description, the first coding and reconstructing module 73 according to this embodiment is specifically configured to write, into the bit stream, an indicator bit for indicating whether the current MATRIX uses a sampling MATRIX, where the indicator bit indicates that the current MATRIX uses no sampling MATRIX; write, into the bit stream, residual data, which is obtained by performing a calculation on a MATRIX element reconstruction value corresponding to each layer having a layer number less than or equal to the to-be-coded layer number and a MATRIX element predicted value corresponding to each layer having the layer number less than or equal to the to-be-coded layer number in the current MATRIX, as coded data of each layer having the layer number less than or equal to the to-be-coded layer number; write, into the bit stream, no coded data of each layer having a layer number greater than the to-be-coded layer number in the current MATRIX; and write, into the bit stream, the to-be-coded layer number.

Still further, the first coding and reconstructing module 73 is further specifically configured to perform, when the layer number of each layer having a layer number less than or equal to the to-be-coded layer number is less than or equal to a set layer number threshold, variable-length code coding on the coded data of each layer having the layer number less than or equal to the to-be-coded layer number and write the coded data after the variable-length code coding into the bit stream, and perform, when the layer number of each layer having the layer number less than or equal to the to-be-coded layer number is greater than the layer number threshold, run-length coding on the coded data of each layer having the layer number less than or equal to the to-be-coded layer number and write the coded data after the run-length coding into the bit stream.

Further, the second coding and reconstructing module 74 is specifically configured to write, into the bit stream, an indicator bit for indicating whether the current MATRIX uses a sampling MATRIX, where the indicator bit indicates that the current MATRIX uses a sampling MATRIX, and write, into the bit stream, no coded data corresponding to the current MATRIX.

For a specific operating principle of the foregoing functional modules, reference may be made to the corresponding description in the embodiment illustrated in FIG. 3, which is not described herein again.

The apparatus for coding a MATRIX according to this embodiment writes only an indicator bit instead of coded data into a bit stream when a sampling MATRIX is used, and writes residual data between an original MATRIX element value and a MATRIX element predicted value into the bit stream when no sampling MATRIX is used, which improves a compression ratio of the MATRIX, reduces a bit rate occupied for transmitting the MATRIX, and further reduces a bit rate occupied for transmitting an entire MATRIX set.

Figure 8:
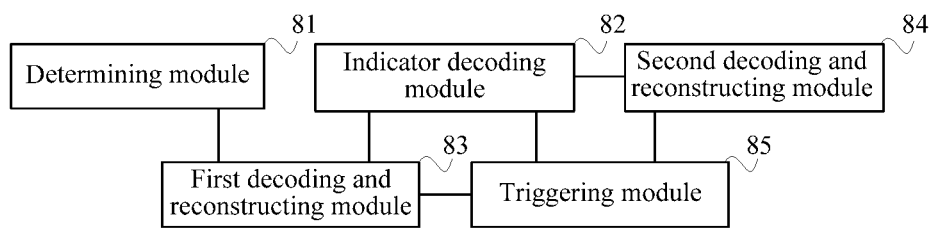
FIG. 8 is a schematic structural diagram of an apparatus for decoding a MATRIX according to still yet another embodiment of the present invention.

FIG. 8 is a schematic structural diagram of an apparatus for decoding a MATRIX according to still yet another embodiment of the present invention. As shown in FIG. 8, the apparatus for decoding a MATRIX according to this embodiment includes a determining module 81, an indicator decoding module 82, a first decoding and reconstructing module 83, a second decoding and reconstructing module 84, and a triggering module 85.

The determining module 81 is configured to determine a decoding order corresponding to a MATRIX set and a corresponding sampling method.

The indicator decoding module 82 is configured to decode a bit stream to obtain an indicator bit for indicating whether a current MATRIX uses a sampling MATRIX.

The first decoding and reconstructing module 83 is connected to the determining module 81 and the indicator decoding module 82, and is configured to use, if the indicator bit indicates that the current MATRIX uses a sampling MATRIX, a sampling MATRIX, which is obtained by performing sampling processing on a decoding reconstruction MATRIX of a MATRIX decoded in the decoding order before the current MATRIX, as a decoding reconstruction MATRIX of the current MATRIX.

The second decoding and reconstructing module 84 is connected to the indicator decoding module 82, and is configured to directly decode the bit stream to obtain the decoding reconstruction MATRIX of the current MATRIX if the indicator bit indicates that the current MATRIX uses no sampling MATRIX.

The triggering module 85 is connected to the indicator decoding module 82, the first decoding and reconstructing module 83, and the second decoding and reconstructing module 84, and is configured to trigger the indicator decoding module 82, the first decoding and reconstructing module 83, and the second decoding and reconstructing module 84, thereby obtaining through decoding, all decoding reconstruction matrices of all matrices in the MATRIX set in the decoding order one by one.

Functional modules of the apparatus for decoding a MATRIX according to this embodiment may be configured to implement a procedure of the method for decoding a MATRIX illustrated in FIG. 4. A specific operating principle thereof is not described again, and reference may be made to the description of the method embodiment for details.

Further, the determining module 81 according to this embodiment is specifically configured to agree upon the decoding order and the corresponding sampling method in advance, or is specifically configured to decode the bit stream to obtain an indicator bit for indicating the decoding order and the corresponding sampling method, thereby determining the decoding order and the corresponding sampling method for decoding the MATRIX set.

The second decoding and reconstructing module 84 according to this embodiment is specifically configured to decode, in the decoding order, the bit stream to obtain the to-be-coded layer number of the current MATRIX, obtain, in an order of layers one by one and according to the to-be-coded layer number and coded data of each layer in the current MATRIX, which has a layer number less than or equal to the to-be-coded layer number, where the coded data is obtained by decoding the bit stream, a MATRIX element reconstruction value corresponding to each layer having the layer number less than or equal to the coded data; and then obtain, by performing a calculation on the MATRIX element reconstruction value corresponding to the layer having the layer number less than or equal to the to-be-coded layer number in the current MATRIX, a MATRIX element reconstruction value corresponding to each layer having a layer number greater than the to-be-coded layer number in the current MATRIX.

More specifically, the second decoding and reconstructing module 84 is configured to perform, if the layer number of each layer having the layer number less than or equal to the to-be-coded layer number is less than or equal to a set layer number threshold, variable-length decoding on a bit stream corresponding to each layer having the layer number less than or equal to the to-be-coded layer number, thereby obtaining coded data of each layer having the layer number less than or equal to the to-be-coded layer number; and perform, if the layer number is greater than the layer number threshold, run-length decoding on the bit stream corresponding to each layer having the layer number less than or equal to the to-be-coded layer number, thereby obtaining the coded data of each layer having the layer number less than or equal to the to-be-coded layer number.

The foregoing functional modules may be specifically configured to perform a corresponding procedure in the method for decoding a MATRIX illustrated in FIG. 4, where a specific operating principle thereof is not described herein again.

The apparatus for decoding a MATRIX according to this embodiment couples with the apparatus for coding a MATRIX illustrated in FIG. 7A. Firstly, a decoding order and a corresponding sampling method are determined, and an indicator bit is obtained by decoding a bit stream; and then a manner of obtaining a decoding reconstruction MATRIX of each MATRIX in a MATRIX set is determined, where when the indicator bit indicates that a current MATRIX uses a sampling MATRIX, no coded data of the current MATRIX exists in the bit stream, which improves a ratio for an apparatus for coding a MATRIX to compress the MATRIX and reduces a bit rate occupied for transmitting the MATRIX.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for decoding a matrix in video decoding, the method comprising:
   decoding a bit stream to obtain a to-be-decoded layer number of the matrix;
   when a layer number of a current layer is less than or equal to the to-be-decoded layer number of the matrix, obtaining, according to decoded data of the current layer which is decoded from the bit stream, a matrix element reconstruction value corresponding to the current layer;
   when the layer number of the current layer is greater than the to-be-decoded layer number of the matrix, obtaining, according to matrix element reconstruction values corresponding to one or more layers decoded before the current layer or previously reconstructed matrix element reconstruction values, the matrix element reconstruction value corresponding to the current layer; and
   obtaining, a reconstructed matrix of the matrix based on matrix element reconstruction values corresponding to each layer of a plurality of layers of the matrix.

2. The method for decoding a matrix according to claim 1, wherein the to-be-decoded layer number of the matrix represents which layers have corresponding decoded data in the bit stream.

3. The method for decoding a matrix according to claim 1, wherein when the layer number of the current layer is less than or equal to the to-be-decoded layer number of the matrix, the decoded data of the current layer is used as the matrix element reconstruction value corresponding to the current layer; or
   when the layer number of the current layer is less than or equal to the to-be-decoded layer number of the matrix, the decoded data of the current layer is added to a matrix element predicted value corresponding to the current layer, to obtain the matrix element reconstruction value corresponding to the current layer, wherein the decoded data of the current layer is residual data of the current layer; or
   when the layer number of the current layer is greater than the to-be-decoded layer number of the matrix, the matrix element reconstruction value corresponding to the current layer is the same as a matrix element predicted value corresponding to the current layer.

4. The method for decoding a matrix according to claim 1, wherein the matrix is at least one of a Quantization matrix, a coefficient weighting matrix, a transform-domain matrix after the Quantization matrix is transformed, a transform-domain matrix after the coefficient weighting matrix is transformed, a prediction residual matrix after coding prediction is performed on the Quantization matrix, or a prediction residual matrix after coding prediction is performed on the coefficient weighting matrix, wherein coding prediction refers to coding the matrix and then obtaining a residual between the matrix after coding and the matrix before coding.

5. The method for decoding a matrix according to claim 1, wherein the obtaining, according to matrix element reconstruction values corresponding to one or more layers decoded before the current layer or previously reconstructed matrix element reconstruction values, a matrix element reconstruction value corresponding to the current layer, comprises:

performing a uniform interpolation calculation or a weighted interpolation calculation on matrix element reconstruction values corresponding to one or more first layers having the layer number less than or equal to the to-be-decoded layer number of the matrix, to obtain the matrix element reconstruction value corresponding to the current layer having the layer number greater than the to-be-decoded layer number of the matrix; or performing a uniform interpolation calculation or a weighted interpolation calculation on matrix element reconstruction values corresponding to one or more first layers having the layer number less than or equal to the to-be-decoded layer number of the matrix and matrix element reconstruction values corresponding to one or more second layers having the layer number greater than the to-be-decoded layer number of the matrix, to obtain the matrix element reconstruction value corresponding to the current layer having the layer number greater than the to-be-decoded layer number of the matrix.

6. The method for decoding a matrix according to claim 1, wherein the obtaining, according to matrix element reconstruction values corresponding to one or more layers decoded before the current layer or previously reconstructed matrix element reconstruction values, a matrix element reconstruction value corresponding to the current layer, comprises:

performing an interpolation calculation on matrix element reconstruction values corresponding to one or more first layers having the layer number less than or equal to the to-be-decoded layer number of the matrix in an order of performing interpolation horizontally before vertically, to obtain the matrix element reconstruction value corresponding to the current layer having the layer number greater than the to-be-decoded layer number of the matrix; or performing an interpolation calculation on matrix element reconstruction values corresponding to one or more first layers having the layer number less than or equal to the to-be-decoded layer number of the matrix in an order of performing interpolation vertically before horizontally, to obtain the matrix element reconstruction value corresponding to the current layer having the layer number greater than the to-be-decoded layer number of the matrix.

7. The method for decoding a matrix according to claim 1, wherein when the layer number of the current layer is less than or equal to a layer number threshold, the decoded data of the current layer is obtained by performing variable-length decoding on the bit stream corresponding to the current layer; and when the layer number of the current layer is greater than the layer number threshold, the decoded data of the current layer is obtained by performing run-length decoding on the bit stream corresponding to the current layer.

8. A method for decoding a matrix in video decoding, the method comprising:

decoding a bit stream to obtain a to-be-decoded layer number of the matrix;

when a layer number of a current layer is less than or equal to the to-be-decoded layer number of the matrix, obtaining, according to decoded data of the current layer which is decoded from the bit stream, a matrix element reconstruction value corresponding to the current layer; and obtaining, a reconstructed matrix of the matrix based on matrix element reconstruction values corresponding to each layer of a plurality of layers of the matrix.

9. A method for decoding a matrix in video decoding, the method comprising:

determining a decoding order corresponding to a matrix set and a corresponding sampling method;

decoding a bit stream to obtain an indicator for indicating whether a current matrix uses a sampling matrix;

when the indicator indicates that the current matrix uses the sampling matrix, using a sampling matrix, which is obtained by performing sampling processing on a reconstructed matrix of a matrix decoded in the decoding order before the current matrix, as a reconstructed matrix of the current matrix; and when the indicator indicates that the current matrix uses no sampling matrix, directly decoding the bit stream to obtain the reconstructed matrix of the current matrix; and obtaining, through decoding, all reconstructed matrices of all matrices in the matrix set in the decoding order one by one.

10. The method for decoding a matrix according to claim 9, wherein the directly decoding the bit stream to obtain the reconstructed matrix of the current matrix comprises:

in the decoding order, decoding the bit stream to obtain a to-be-decoded layer number of the current matrix;

when a layer number of the current layer is less than or equal to the to-be-decoded layer number of the matrix, obtaining, according to decoded data of the current layer which is decoded from the bit stream, a matrix element reconstruction value corresponding to the current layer;

when the layer number of the current layer is greater than the to-be-decoded layer number of the matrix, obtaining, according to matrix element reconstruction values corresponding to one or more layers decoded before the current layer or previously reconstructed matrix element reconstruction values, a matrix element reconstruction value corresponding to the current layer; and obtaining, a reconstructed matrix of the current matrix based on matrix element reconstruction values corresponding to each layer of a plurality of layers of the matrix.

11. The method for decoding a matrix according to claim 10, wherein when the layer number of the current layer is less than or equal to a layer number threshold, the decoded data of the current layer is obtained by performing variable-length decoding on the bit stream corresponding to the current layer; and when the layer number of the current layer is greater than the layer number threshold, the decoded data of the current layer is obtained by performing run-length decoding on the bit stream corresponding to the current layer.

12. An apparatus for decoding a matrix in video decoding, the apparatus comprising:
a layer quantity decoding module, configured to decode a bit stream to obtain a to-be-decoded layer number of the matrix;
a reconstructing module, configured to obtain, according to decoded data of the current layer which is decoded from the bit stream, a matrix element reconstruction value corresponding to the current layer when a layer number of the current layer is less than or equal to the to-be-decoded layer number of the matrix; or, obtain, according to matrix element reconstruction values corresponding to one or more layers decoded before the current layer or previously reconstructed matrix element reconstruction values, a matrix element reconstruction value corresponding to the current layer when the layer number of the current layer is greater than the to-be-decoded layer number of the matrix; and obtain, a reconstructed matrix of the matrix based on matrix element reconstruction values corresponding to each layer of a plurality of layers of the matrix.

13. The apparatus for decoding a matrix according to claim 12, wherein the to-be-decoded layer number of the matrix represents which layers have corresponding decoded data in the bit stream.

14. The apparatus for decoding a matrix according to claim 12, wherein when the layer number of the current layer is less than or equal to the to-be-decoded layer number of the matrix, the decoded data of the current layer is used as the matrix element reconstruction value corresponding to the current layer; or
when the layer number of the current layer is less than or equal to the to-be-decoded layer number of the matrix, the decoded data of the current layer is added to a matrix element predicted value corresponding to the current layer, to obtain the matrix element reconstruction value corresponding to the current layer, wherein the decoded data of the current layer is residual data of the current layer; or
when the layer number of the current layer is greater than the to-be-decoded layer number of the matrix, the matrix element reconstruction value corresponding to the current layer is the same as a matrix element predicted value corresponding to the current layer.

15. The apparatus for decoding a matrix according to claim 12, wherein the matrix is at least one of a Quantization matrix, a coefficient weighting matrix, a transform-domain matrix after the Quantization matrix is transformed, a transform-domain matrix after the coefficient weighting matrix is transformed, a prediction residual matrix after coding prediction is performed on the Quantization matrix, or a prediction residual matrix after coding prediction is performed on the coefficient weighting matrix, wherein coding prediction refers to coding the matrix and then obtain a residual between the matrix after coding and the matrix before coding.

16. The apparatus for decoding a matrix according to claim 12, wherein for the obtaining, according to matrix element reconstruction values corresponding to one or more layers decoded before the current layer or previously reconstructed matrix element reconstruction values, a matrix element reconstruction value corresponding to the current layer, the reconstructing module is configured to:
perform a uniform interpolation calculation or a weighted interpolation calculation on matrix element reconstruction values corresponding to one or more first layers having the layer number less than or equal to the to-be-decoded layer number of the matrix, to obtain the matrix element reconstruction value corresponding to the current layer having the layer number greater than the to-be-decoded layer number of the matrix; or
perform a uniform interpolation calculation or a weighted interpolation calculation on matrix element reconstruction values corresponding to one or more first layers having the layer number less than or equal to the to-be-decoded layer number of the matrix and matrix element reconstruction values corresponding to one or more second layers having the layer number greater than the to-be-decoded layer number of the matrix, to obtain the matrix element reconstruction value corresponding to the current layer having the layer number greater than the to-be-decoded layer number of the matrix.

17. The apparatus for decoding a matrix according to claim 12, wherein for the obtaining, according to matrix element reconstruction values corresponding to one or more layers decoded before the current layer or previously reconstructed matrix element reconstruction values, a matrix element reconstruction value corresponding to the current layer, the reconstructing module is configured to:
perform an interpolation calculation on matrix element reconstruction values corresponding to one or more first layers having the layer number less than or equal to the to-be-decoded layer number of the matrix in an order of perform interpolation horizontally before vertically, to obtain the matrix element reconstruction value corresponding to the current layer having the layer number greater than the to-be-decoded layer number of the matrix; or
perform an interpolation calculation on matrix element reconstruction values corresponding to one or more first layers having the layer number less than or equal to the to-be-decoded layer number of the matrix in an order of perform interpolation vertically before horizontally, to obtain the matrix element reconstruction value corresponding to the current layer having the layer number greater than the to-be-decoded layer number of the matrix.

18. An apparatus for decoding a matrix in video decoding, the apparatus comprising:
a layer quantity decoding module, configured to decode a bit stream to obtain a to-be-decoded layer number of the matrix;
a reconstructing module, configured to obtain, according to decoded data of the current layer which is decoded from the bit stream, a matrix element reconstruction value corresponding to the current layer, when a layer number of the current layer is less than or equal to the to-be-decoded layer number of the matrix; and obtain, a reconstructed matrix of the matrix based on matrix element reconstruction values corresponding to each layer of a plurality of layers of the matrix.

19. An apparatus for decoding a matrix in video decoding, the apparatus comprising:
a determining module, configured to determine a decoding order corresponding to a matrix set and a corresponding sampling apparatus;
an indicator decoding module, configured to decode a bit stream to obtain an indicator for indicating whether a current matrix uses a sampling matrix;

a first decoding and reconstructing module, configured to use, when the indicator indicates that the current matrix uses a sampling matrix, a sampling matrix, which is obtained by performing sampling processing on a reconstructed matrix of a matrix decoded in the decoding order before the current matrix, as a reconstructed matrix of the current matrix; and a second decoding and reconstructing module, configured to directly decode the bit stream to obtain the reconstructed matrix of the current matrix when the indicator indicates that the current matrix uses no sampling matrix; and a triggering module, configured to trigger the indicator decoding module, the first decoding and reconstructing module, and the second decoding and reconstructing module, thereby decoding the bit stream to obtain all reconstructed matrices of all matrices in the matrix set in the decoding order one by one.

20. The apparatus for decoding a matrix according to claim 19, wherein the second decoding and reconstructing module is configured to:

in the decoding order, decode the bit stream to obtain a to-be-decoded layer number of the current matrix;

obtain, according to decoded data of the current layer which is decoded from the bit stream, a matrix element reconstruction value corresponding to the current layer, when a layer number of the current layer is less than or equal to the to-be-decoded layer number of the matrix;

obtain, according to matrix element reconstruction values corresponding to one or more layers decoded before the current layer or previously reconstructed matrix element reconstruction values, a matrix element reconstruction value corresponding to the current layer, when the layer number of the current layer is greater than the to-be-decoded layer number of the matrix; and obtain, a reconstructed matrix of the current matrix based on matrix element reconstruction values corresponding to each layer of a plurality of layers of the matrix.

* * * * *

UNITED STATES PATENT AND TRADEMARK OFFICE
CERTIFICATE OF CORRECTION

PATENT NO. : 10,742,982 B2
APPLICATION NO. : 16/157739
DATED : August 11, 2020
INVENTOR(S) : Wang et al.

Page 1 of 1

It is certified that error appears in the above-identified patent and that said Letters Patent is hereby corrected as shown below:

On the Title Page

Item (73) Assignee "Tsinghua Univeristy" should read -- Tsinghua University --

Signed and Sealed this
First Day of September, 2020

Andrei Iancu
*Director of the United States Patent and Trademark Office*